US011904795B2

(12) United States Patent
Line et al.

(10) Patent No.: US 11,904,795 B2
(45) Date of Patent: Feb. 20, 2024

(54) SEAT ASSEMBLY WITH DEPLOYABLE BELT MEMBER

(71) Applicant: Ford Global Technologies, LLC, Dearborn, MI (US)

(72) Inventors: Johnathan Andrew Line, Northville, MI (US); Joseph Michael Kish, Canton, MI (US); Macit Aktas, Windsor (CA); Benjamin Yilma, Canton, MI (US); Derek Board, Ferndale, MI (US); Kevin Michael Pline, Plymouth, MI (US); Raed El-Jawahri, Northville, MI (US); Jeff Charles Paddock, Dearborn, MI (US); James Robert Chascsa, II, Farmington Hills, MI (US); Marcos Silva Kondrad, Macomb Township, MI (US); Rachel Demerly, Bloomfield Hills, MI (US); Robyne McBride, Belle River (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/845,086

(22) Filed: Jun. 21, 2022

(65) Prior Publication Data
US 2023/0406258 A1    Dec. 21, 2023

(51) Int. Cl.
*B60R 21/207*     (2006.01)
*B60R 21/2334*    (2011.01)
(Continued)

(52) U.S. Cl.
CPC ........ *B60R 22/1951* (2013.01); *B60R 21/207* (2013.01); *B60R 21/214* (2013.01);
(Continued)

(58) Field of Classification Search
CPC .............. B60R 21/207; B60R 21/2334; B60R 2021/23388; B60R 22/1951
See application file for complete search history.

(56) References Cited

U.S. PATENT DOCUMENTS

| 5,456,491 A | 10/1995 | Chen et al. |
| 5,564,748 A | 10/1996 | Kmiec et al. |

(Continued)

FOREIGN PATENT DOCUMENTS

| CN | 104648194 | 10/2017 | |
| DE | 102014004185 A1 * | 9/2015 | ............. B60R 21/08 |

(Continued)

*Primary Examiner* — Barry Gooden, Jr.
(74) *Attorney, Agent, or Firm* — Vichit Chen; Price Heneveld LLP

(57) ABSTRACT

A seat assembly includes a seatback having an interior portion with a seatback frame disposed therein. A retraction mechanism includes a first bracket operably coupled to the seatback frame. A second bracket is operably coupled to the first bracket by an actuator that is operable between at-rest and actuated positions. A tether member includes a body portion that is operably coupled between the first and second brackets of the retraction mechanism for movement therewith. The tether member moves from a deployed position to a retracted position when the actuator moves from the at-rest position to the actuated position. A belt member is operably coupled to the tether member. The belt member is operable between a deployed position, wherein the belt member is disposed in front of the back support portion of the seatback, and a stowed position, wherein the belt member is received in the interior portion of the seatback.

17 Claims, 25 Drawing Sheets

US 11,904,795 B2
Page 2

(51) Int. Cl.
  *B60R 22/195* (2006.01)
  *B60R 22/26* (2006.01)
  *B60R 21/214* (2011.01)

(52) U.S. Cl.
  CPC ...... *B60R 21/2334* (2013.01); *B60R 22/1955* (2013.01); *B60R 22/26* (2013.01)

(56) References Cited

U.S. PATENT DOCUMENTS

| | | | |
|---|---|---|---|
| 5,685,567 A | 11/1997 | Koujiya et al. | |
| 5,704,638 A | 1/1998 | Lane, Jr. | |
| 5,911,433 A | 6/1999 | Swann | |
| 6,079,745 A | 6/2000 | Wier | |
| 6,447,011 B1 | 9/2002 | Vollmer | |
| 7,097,206 B2 | 8/2006 | Walenta | |
| 7,398,998 B2 | 7/2008 | Arnold | |
| 7,607,687 B2 | 10/2009 | Clute et al. | |
| 7,976,066 B2 | 7/2011 | Bok et al. | |
| 8,226,122 B2 | 7/2012 | Lane, Jr. | |
| 8,528,986 B2 | 9/2013 | Masutani | |
| 8,672,347 B2 | 3/2014 | Schneider et al. | |
| 9,114,780 B2 | 8/2015 | Fischer et al. | |
| 9,199,560 B2 | 12/2015 | Line et al. | |
| 9,428,137 B2 | 8/2016 | Lee | |
| 10,086,731 B2 | 10/2018 | Hall et al. | |
| 10,336,284 B2 | 7/2019 | Dry et al. | |
| 10,974,626 B2 * | 4/2021 | Yilma | B60N 2/42718 |
| 11,124,147 B2 * | 9/2021 | Line | B60R 21/207 |
| 11,383,667 B1 * | 7/2022 | Kadam | B60R 21/23138 |
| 11,618,404 B1 * | 4/2023 | Jaradi | B60R 21/23138 |
| | | | 280/730.1 |
| 11,667,258 B1 * | 6/2023 | Golman | B60R 21/214 |
| | | | 280/728.1 |
| 11,713,014 B1 * | 8/2023 | Faruque | B60R 21/264 |
| | | | 280/728.1 |
| 11,766,982 B1 * | 9/2023 | Rivera | B60R 21/231 |
| | | | 280/728.2 |
| 2001/0011810 A1 * | 8/2001 | Saiguchi | B60N 2/4221 |
| | | | 296/68.1 |
| 2003/0230872 A1 * | 12/2003 | Sakai | B60N 2/42718 |
| | | | 280/728.1 |
| 2009/0302593 A1 | 12/2009 | Grau et al. | |
| 2009/0309397 A1 | 12/2009 | Gross et al. | |
| 2011/0121620 A1 | 5/2011 | Masutani | |
| 2013/0278026 A1 | 10/2013 | Kobayashi et al. | |
| 2018/0022244 A1 | 1/2018 | Duncan et al. | |
| 2020/0391690 A1 | 12/2020 | Faruque et al. | |
| 2020/0406855 A1 * | 12/2020 | Saito | B60R 21/2338 |
| 2021/0009067 A1 | 1/2021 | Kadam et al. | |
| 2021/0009068 A1 * | 1/2021 | Farooq | B60N 2/64 |
| 2021/0078468 A1 * | 3/2021 | Yilma | B60R 21/18 |
| 2021/0078521 A1 * | 3/2021 | Line | B60R 21/2334 |
| 2021/0101511 A1 * | 4/2021 | Berry | B60N 2/68 |
| 2021/0339697 A1 * | 11/2021 | Nagasawa | B60R 21/207 |
| 2022/0348161 A1 * | 11/2022 | Faruque | B60R 21/233 |
| 2022/0379833 A1 * | 12/2022 | Shimizu | B60R 21/207 |
| 2023/0322177 A1 * | 10/2023 | Toni | B60R 21/2334 |
| | | | 280/730.2 |

FOREIGN PATENT DOCUMENTS

| | | | | |
|---|---|---|---|---|
| DE | 102014004186 A1 * | 9/2015 | | B60R 21/08 |
| DE | 102016012075 A1 * | 9/2017 | | |
| EP | 3862231 A1 * | 8/2021 | | |
| JP | 2019147426 A * | 9/2019 | | |
| KR | 100570356 | 4/2006 | | |

\* cited by examiner

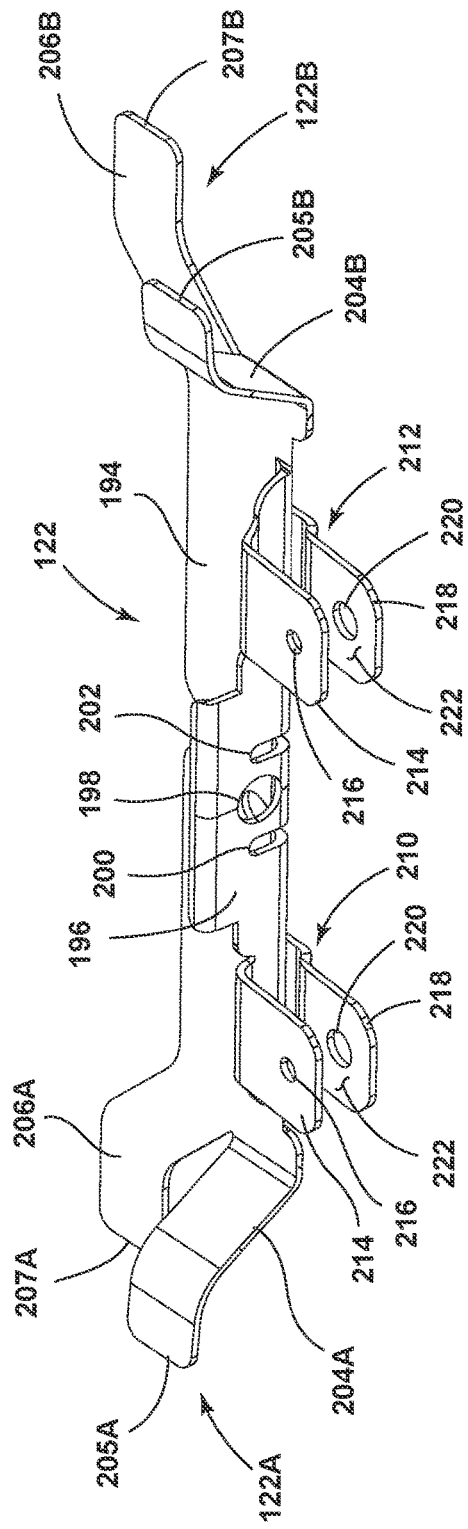
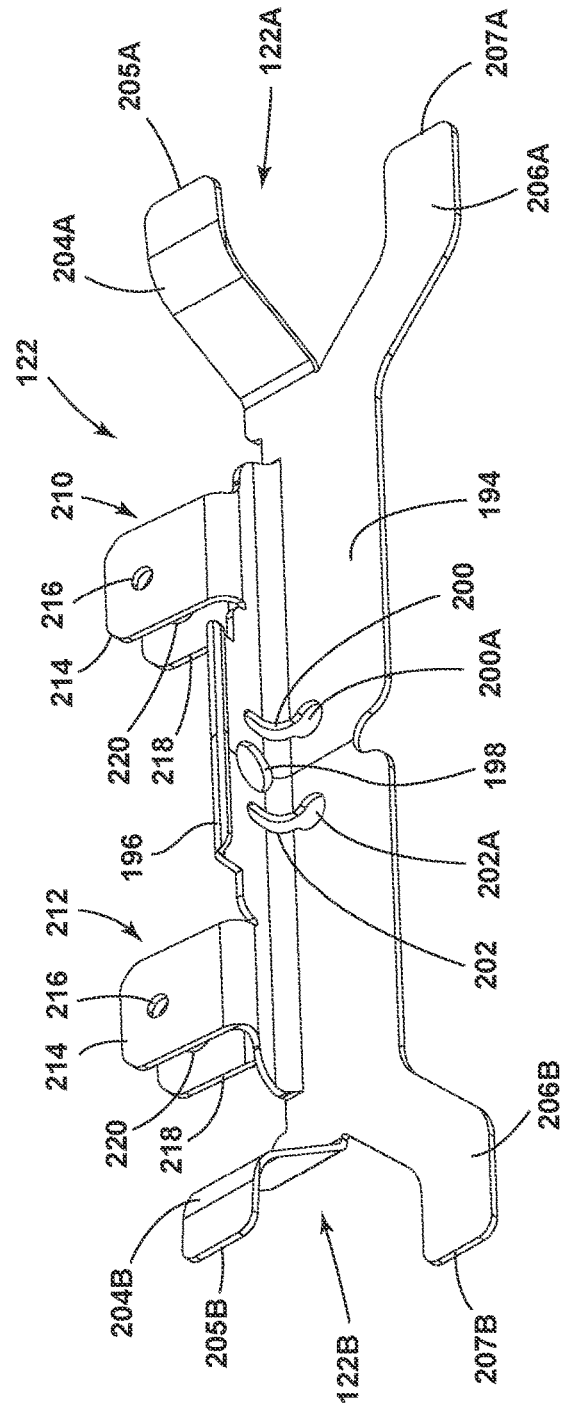
FIG. 11A
FIG. 11B

SEAT ASSEMBLY WITH DEPLOYABLE BELT MEMBER

FIELD OF THE INVENTION

The present invention generally relates to a seat assembly, and more particularly, to a seat assembly having a belt assembly that is deployed with an airbag assembly, wherein the belt assembly retracts for seat occupant position management.

BACKGROUND OF THE INVENTION

Seat occupant position management features are desired for a seat assembly. A deployable and retractable belt assembly can be used to facilitate seat occupant position management.

SUMMARY OF THE INVENTION

According to one aspect of the present invention, a seat assembly includes a seatback having an interior portion. The seatback includes a back support portion centrally disposed thereon. A retraction mechanism is positioned within the interior portion of the seatback. The retraction mechanism includes an airbag that is operable between at-rest and deployed conditions. A tether member includes first and second ends with a body portion disposed therebetween. The body portion of the tether member is operably coupled to the airbag of the retraction mechanism for movement therewith. The tether member moves from a deployed position to a retracted position when the airbag moves from the at-rest condition to the deployed condition. A belt member includes first and second ends with a body portion disposed therebetween. The first and second ends of the belt member are respectively coupled to the first and second ends of the tether member. The body portion of the belt member is operable between a deployed position, wherein the belt member is disposed in front of the back support portion of the seatback, and a stowed position, wherein the belt member is received in the interior portion of the seatback.

According to another aspect of the present invention, a seat assembly includes a seatback having a forward-facing back support portion and an interior portion. The seatback further includes a seatback frame disposed within the interior portion. A retraction mechanism includes a first bracket operably coupled to the seatback frame. A second bracket is operably coupled to the first bracket. The first and second brackets are interconnected by an actuator that is operable between at-rest and actuated positions. A tether member includes a body portion that is operably coupled between the first and second brackets of the retraction mechanism for movement therewith. The tether member moves from a deployed position to a retracted position when the actuator moves from the at-rest position to the actuated position. A belt member is operably coupled to the tether member. The belt member is operable between a deployed position, wherein the belt member is disposed in front of the back support portion of the seatback, and a stowed position, wherein the belt member is received in the interior portion of the seatback.

According to yet another aspect of the present invention, a seat assembly includes a seatback having a seatback frame disposed within a seatback interior. A retraction mechanism is disposed within the seatback interior. The retraction mechanism is operable between at-rest and deployed positions. At least one tether member includes a body portion. The body portion of the at least one tether member is operably coupled to the retraction mechanism for movement therewith.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 11A is a front top perspective view of a first bracket of the retraction mechanism of FIG. 10;

FIG. 11B is a rear top perspective view of the first bracket of FIG. 11A;

DETAILED DESCRIPTION OF THE PREFERRED EMBODIMENTS

Figure 1:
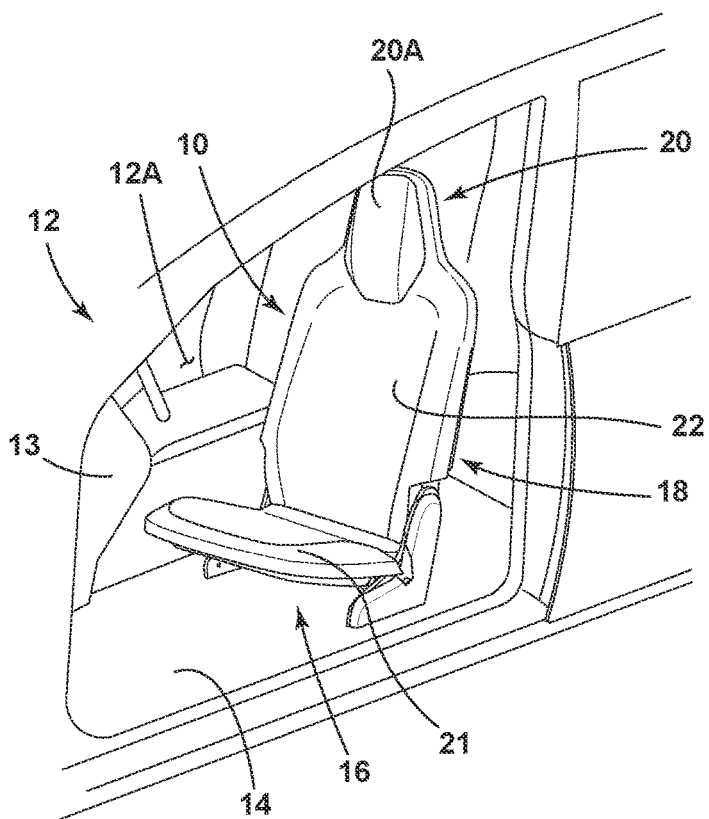
FIG. 1 is a front perspective view of a seat assembly positioned within a vehicle interior.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed on other seat assemblies positioned in other areas of a vehicle interior 12A, such as the passenger side seating area, a rear seating area, or a third row seating option for example. The seat assembly 10 is shown in FIG. 1 as being supported on a vehicle floor support surface 14 and generally includes a substantially horizontal seat portion 16 and a substantially upright seatback 18.

Figure 2:
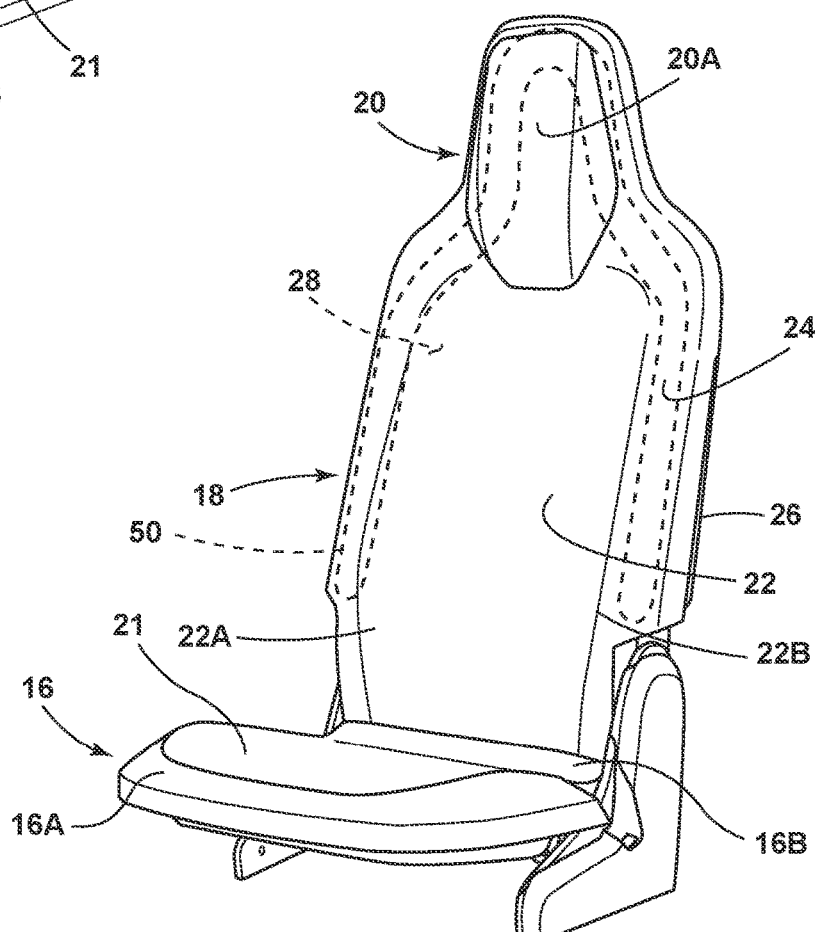
FIG. 2 is a front perspective view of the seat assembly of FIG. 1 as removed from the vehicle and showing an overhead airbag assembly in phantom.

As shown in FIGS. 1 and 2, a headrest assembly 20 is disposed on an upper portion of the seatback 18 and includes a forwardly extending headrest bun 20A. The headrest assembly 20 and the seatback 18 may be integrated components or modular components coupled to one another. As further shown in FIG. 1, the seat portion 16 includes an upper support surface 21 configured to support a seat occupant thereon. As further shown in FIG. 2, the seat portion 16 includes a front portion 16A and a rear portion 16B. Further, the seatback 18 includes a back support portion 22 that is centrally disposed on the seatback 18.

With specific reference to FIG. 2, the back support portion 22 is contemplated to include various support materials, such as cloth and foam materials, packaged on an exterior comfort carrier module, or front carrier module 24, to support the back of a seat occupant seated on the seat assembly 10. The back support portion 22 of the seatback 18 is a forward-facing back support portion that includes opposed sides 22A, 22B that are spaced-apart from one another. As further shown in FIG. 2, the headrest assembly 20 is disposed above the back support portion 22 of the seatback 18 and may be an integrated feature of the front carrier module 24. In assembly, the front carrier module 24 is coupled to a rear carrier module 26 around a seatback frame 30 (FIG. 3) in a partially detachable manner, as further described below. The coupling of the front carrier module 24 and the rear carrier module 26 defines an interior portion 28 of the seatback 18 disposed between the front carrier module 24 and the rear carrier module 26. The seatback frame 30 (FIG. 3) is disposed within the interior portion 28 of the seatback 18 in assembly.

Figure 6:
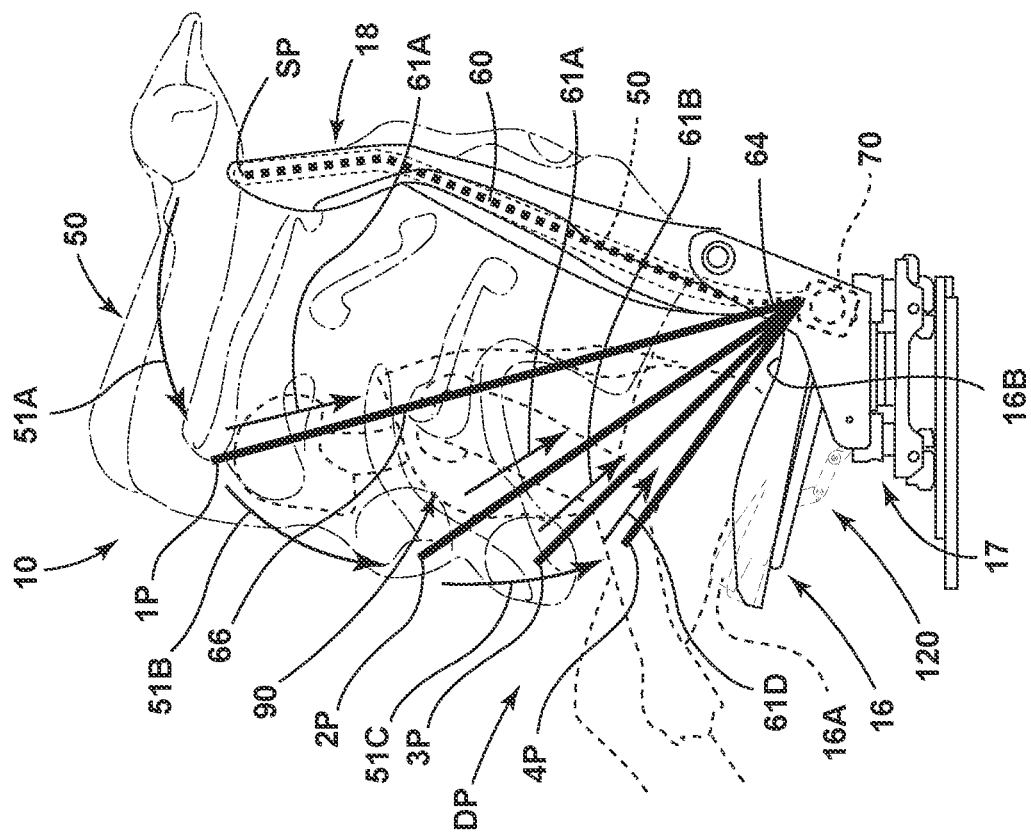
FIG. 6 is a side elevation view of the seat assembly of FIG. 5 showing relative movement of the overhead airbag assembly and the belt member deploying from the stowed positions, and further showing relative movement of the belt member during retraction of the belt member.

As further shown in FIG. 2, the seat assembly 10 includes an airbag assembly 50 disposed within the interior portion 28 of the seatback 18. The airbag assembly 50 is operable between deployed and stowed positions. In FIG. 2, the airbag assembly 50 is shown in the stowed position, in which the airbag assembly 50 is supported and contained within the interior portion 28 of the seatback 18. The airbag assembly 50 is configured to deploy from the stowed position to a deployed position in a seat-forward direction over and around the back support portion 22 of the seatback 18, as shown in FIG. 6. The airbag assembly 50 is disposed along the opposed sides 22A, 22B of the back support portion 22 of the seatback 18 and is further disposed around an outer perimeter of the headrest assembly 20 of the seatback 18 in the stowed position. In this way, the airbag assembly 50 is an overhead airbag assembly that is configured to outwardly deploy to surround a seat occupant, much like the airbag assemblies disclosed in U.S. patent application Ser. No. 16/370,617 and U.S. Pat. No. 10,821,929 entitled SEAT ASSEMBLY WITH FULL SEATBACK AIRBAG filed Mar. 29, 2019, which are hereby incorporated by reference in their entireties.

Figure 3:
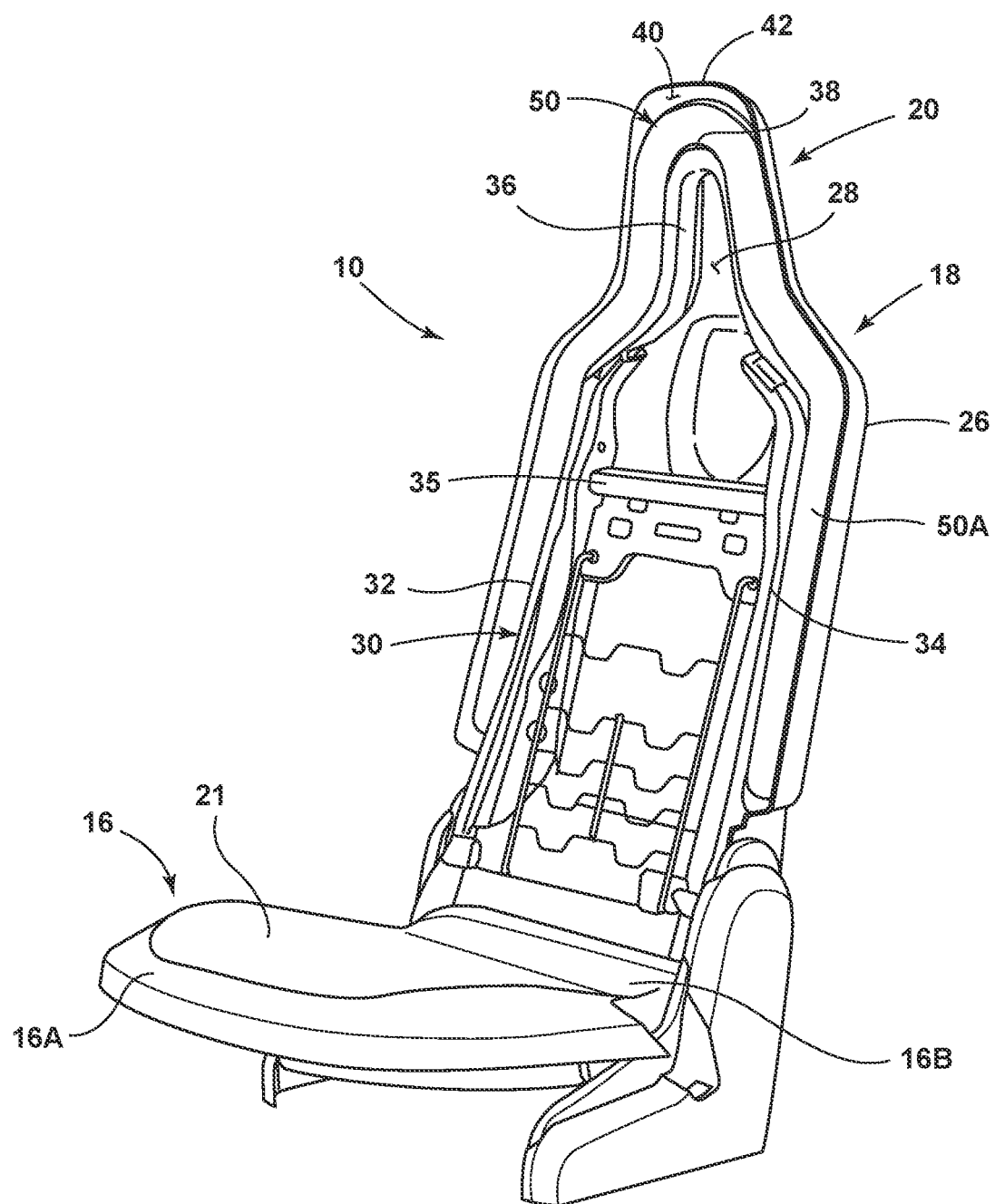
FIG. 3 is a front perspective view of the seat assembly of FIG. 2 with a front carrier module removed to reveal a seatback frame and the overhead airbag assembly.

Referring now to FIG. 3, the seat assembly 10 is shown with the front carrier module 24 removed therefrom to reveal a seatback frame 30 disposed within the interior portion 28 of the seatback 18. The seatback frame 30 is shown having a generally inverted U-shaped configuration partially defined by first and second side members 32, 34 which are generally disposed in an upright orientation and spaced-apart from one another. The first and second side members 32, 34 are interconnected by an upper crossmember 35 and are contemplated to be mirror images of one another, such that the description of one side member also describes the other side member in a mirrored configuration. As further shown in FIG. 3, an upper frame member 36 interconnects the first and second side members 32, 34 of the seatback frame 30. Thus, the first and second side members 32, 34 and the upper frame member 36 cooperate to generally define the overall inverted U-shaped configuration of the seatback frame 30.

With further reference to FIG. 3, the airbag assembly 50 is shown disposed within a raceway 40 defined between an outer perimeter edge 38 of the seatback frame 30 and a front edge 42 of the rear carrier module 26. The airbag assembly 50 includes an elongate body portion 50A, such that the airbag assembly 50 is an elongate member having an overall inverted U-shaped configuration in the stowed position shown in FIG. 3. In this way, the body portion 50A of the airbag assembly 50 extends all the way around the outer perimeter edge 38 of the seatback frame 30 as received in the raceway 40 within the interior portion 28 of the seatback 18 when the airbag assembly 50 is in the stowed position. It is contemplated that the airbag assembly 50 is a flexible member, such that the body portion 50A of the airbag assembly 50 can fit within the contours of the raceway 40. Thus, the airbag assembly 50 of the present concept is provided to surround the entire seatback 18 at an outer portion thereof, such that the airbag assembly 50 of the present concept is an overhead airbag assembly that surrounds the arms, torso and head of a seat occupant as seated within the seat assembly 10 when the airbag assembly 50 is deployed. This surround feature of the airbag assembly 50 in a deployed position relative to a seated seat occupant is illustrated in FIGS. 6 and 8-10 and further described below.

Figure 4:
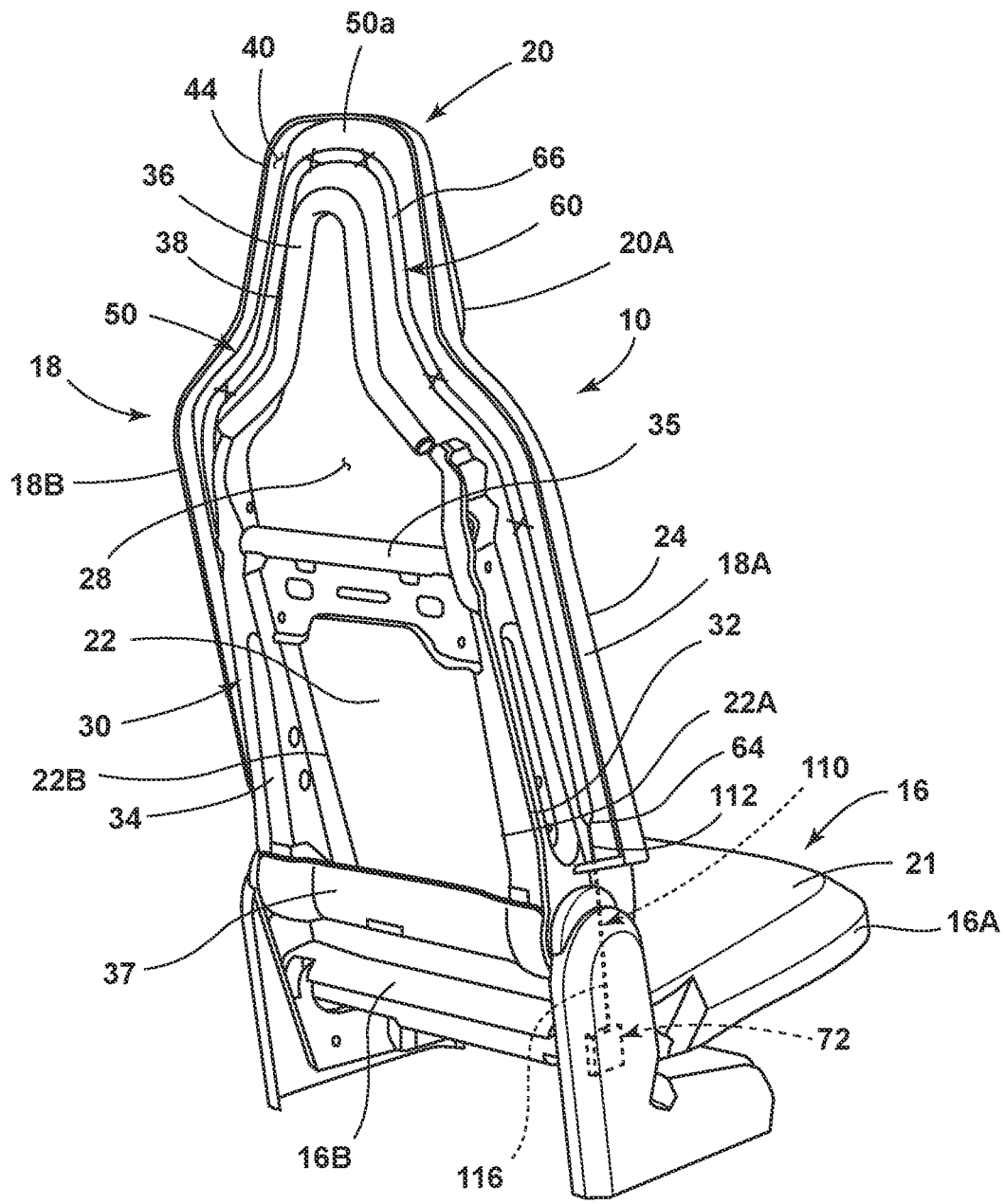
FIG. 4 is a rear perspective view of the seat assembly of FIG. 2 with a rear carrier module removed to reveal the seatback frame, the overhead airbag assembly and a belt member coupled to the overhead airbag assembly and a routing mechanism.

Referring now to FIG. 4, the seat assembly 10 is shown with the rear carrier module 26 removed from the seatback 18 to reveal the seatback frame 30 as positioned relative to the front carrier module 24 within the interior portion 28 of the seatback 18. As shown in FIG. 4, the outer perimeter edge 38 of the seatback frame 30 is disposed at an inset position relative to a rear edge 44 of the front carrier module 24. Specifically, the rear edge 44 of the front carrier module 24 is spaced-apart outwardly from the outer perimeter edge 38 of the seatback frame 30 to further define the raceway 40 therebetween. Thus, the raceway 40, in which the airbag assembly 50 is supported in the stowed position, is defined between the front carrier module 24, the rear carrier module 26 and the seatback frame 30. As further shown in FIG. 4, a lower cross member 37 of the seatback frame 30 interconnects the first and second side members 32, 34 of the seatback frame 30.

As further shown in FIG. 4, a belt member 60 is shown as being disposed along the body portion 50A of the airbag assembly 50. The belt member 60 is contemplated to be operably coupled to the airbag assembly 50 at the "X" symbols shown in FIG. 4 for deployment with the airbag assembly 50. The "X" symbols shown in FIG. 4 may include clips, stitches or other like coupling mechanisms that operably couple a body portion 66 of the belt member 60 to the airbag assembly 50 for deployment therewith. Thus, the belt member 60 is operable between stowed and deployed positions, and is shown in FIG. 4 in the stowed position, wherein the belt member is received within the interior portion 28 of the seatback 18. The belt member 60 includes first and second ends 62, 64 (best shown in the embodiment of FIGS. 8A-8C) with the body portion 66 disposed therebetween. In FIG. 4, the second end 64 of the belt member 60 is shown coupled to a second tether member 110. The second tether member 110 and the belt member 60 are both part of a belt assembly 68, as further described below. In FIG. 4, the second tether member 110 includes a first end 112 coupled to the second end 64 of the belt member 60. The second tether member 110 further includes a body portion 116 that is shown coupled to a first routing mechanism 72. The second routing mechanism 72 routes the body portion 116 of the second tether member 110 from the rear portion 16B of the seat portion 16 to a retraction mechanism 120 (best shown in FIGS. 7A-8C). As further described below, the retraction mechanism 120 is provided to retract the belt member 60 via the second tether member 110 after the belt member 60 is deployed. The second routing mechanism 72 may be coupled to the seat portion 16 at a frame assembly 17 thereof. In this way, the belt member 60 is an overhead belt member that is configured to outwardly deploy to surround a seat occupant, much like the belt member disclosed in U.S. Pat. No. 11,124,147 entitled SEAT ASSEMBLY WITH DEPLOYABLE BELT MEMBER filed Sep. 17, 2019, which is hereby incorporated by reference in its entirety.

Figure 5:
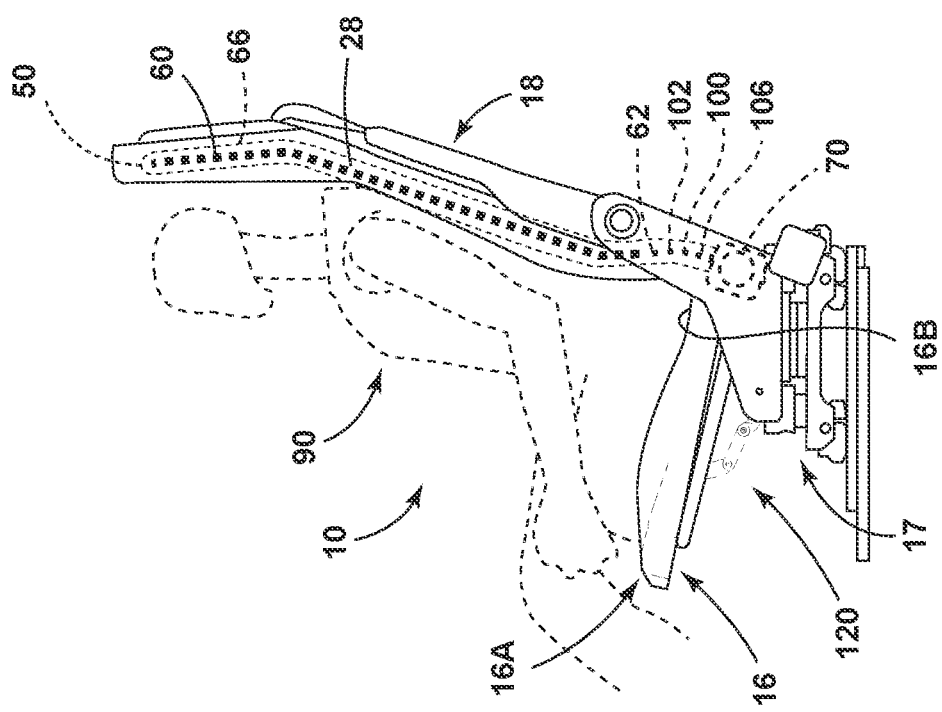
FIG. 5 is a side elevation view of the seat assembly of FIG. 2 with a seat occupant seated in the seat assembly and further showing the overhead airbag assembly and the belt member in stowed positions in phantom in an interior of the seatback.

Referring now to FIG. 5, a seat occupant 90 is shown seated on the seat assembly 10 in a generally upright position as supported on the seat portion 16. The seat occupant 90 is further supported by the seatback 18 in which the airbag assembly 50 and the belt member 60 are disposed in the interior portion 28 of the seatback 18 as operably coupled to one another in the stowed position. In FIG. 5, the first end 62 of the belt member 60 is shown coupled to a first tether member 100. The first tether member 100, the second tether member 110 (FIG. 4) and the belt member 60 are all part of a belt assembly 68, as further described below. In FIG. 5, the first tether member 100 includes a first end 102 coupled to the first end 62 of the belt member 60. The first tether member 100 further includes a body portion 106 that is shown coupled to a first routing mechanism 70. Much like the second routing mechanism 72 with respect to the second tether member 110, the first routing mechanism 70 routes the body portion 106 of the first tether member 100 from the rear portion 16B of the seat portion 16 to the retraction mechanism 120, as best shown in FIGS. 7A-8C. In this way, the first and second tether members 100, 110 are disposed on opposed sides of the seat portion 16 to retract the first and second ends 62, 64 of the belt member 60 simultaneously via the singular retraction mechanism 120.

Referring now to FIG. 6, the airbag assembly 50 is shown as being deployed over the seat occupant 90 to surround the seat occupant 90. Specifically, in FIG. 6, the airbag assembly 50 and the belt member 60 are shown in phantom in a stowed position SP. From the stowed position SP, the airbag assembly 50 moves towards a deployed position DP around the seat occupant 90. As coupled to the airbag assembly 50, the belt member 60 moves towards a deployed position DP from the stowed position SP. Thus, the airbag assembly 50 and the belt member 60 exit the interior portion 28 of the seatback 18 and project in a seat-forward direction from the stowed position SP to the deployed position DP, such that the airbag assembly 50 and the belt member are disposed around the centrally disposed back support portion 22 of the seatback 18 in the deployed position DP. As specifically shown in FIG. 6, the body portion 66 of the belt member 60 is shown being deployed around the seat occupant 90 at deployment positions 1P-4P. Deployment positions 1P-4P also correlate to attachment locations (as denoted by the symbol "X" in FIG. 4) of the body portion 66 of the belt member 60 to the airbag assembly 50. Thus, the belt member 60 and the airbag assembly 50 move over the head of the seat occupant 90 at the first deployment position 1P from the stowed position SP along the path as indicated by arrow 51A. From the first deployment position 1P to a second deployment position 2P, the airbag assembly 50 and the belt member 60 move downward along the path as indicated by arrow 51B. From the second deployment position 2P to a third deployment position 3P, the airbag assembly and the belt member 60 move further downward along the path as indicated by arrow 51C around the seat occupant 90. From the third deployment position 3P, the airbag assembly 50 and the belt member 60 move further downward along the path as indicated by arrow 51D to a fourth deployment position 4P which correlates to a fully deployed position indicated at deployed position DP. In the deployed position DP, the belt member 60 is contemplated to be positioned around a hip location of the seat occupant 90 that may correlate to a location of a standard lap belt and a buckle position.

As further shown in FIG. 6, the body portion 66 of the belt member 60 is retracted by the retraction mechanism 120 along the path as indicated by arrows 61A-61D. As shown in FIG. 6, arrows 61A-61D illustrate a retraction movement of the belt member 60 from the respective deployment positions 1P-4P towards the second routing mechanism 72. Thus, it is contemplated that the retraction of the belt member 60 by the retraction mechanism 120 may occur immediately after deployment of the belt member 60 and the airbag assembly 50. It is further contemplated that the retraction of the belt member 60 by the retraction mechanism 120 may occur once the belt member 60 is at the deployed position DP.

As further shown in FIG. 6, a front portion 16A of the seat portion 16 is lifted as the belt member 60 retracts. The upward movement of the front portion 16A of the seat portion 16 is provided to facilitate passenger position management through the seat assembly 10. Further, it is contemplated that the seat assembly 10 of the present concept provides for the upward movement of the front portion 16A of the seat portion 16 in concert with the retraction of the belt member 60. This synchronized movement is provided by the retraction mechanism 120, as further described below.

Figure 7A:
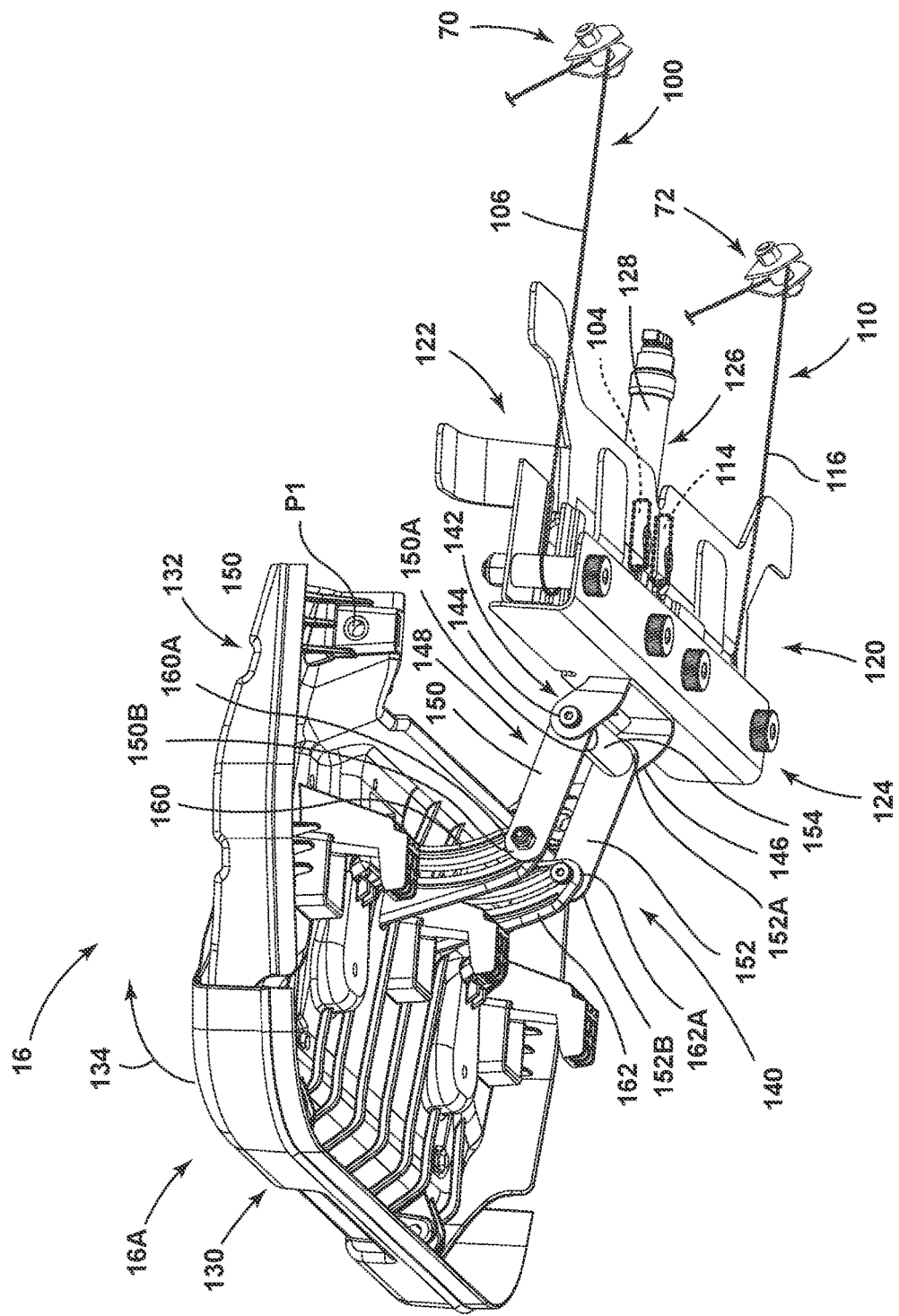
FIG. 7A is a bottom perspective view of a carrier assembly with a displaceable platform in an at-rest position as coupled to a retraction mechanism having a second bracket in a first position.
Figure 7B:
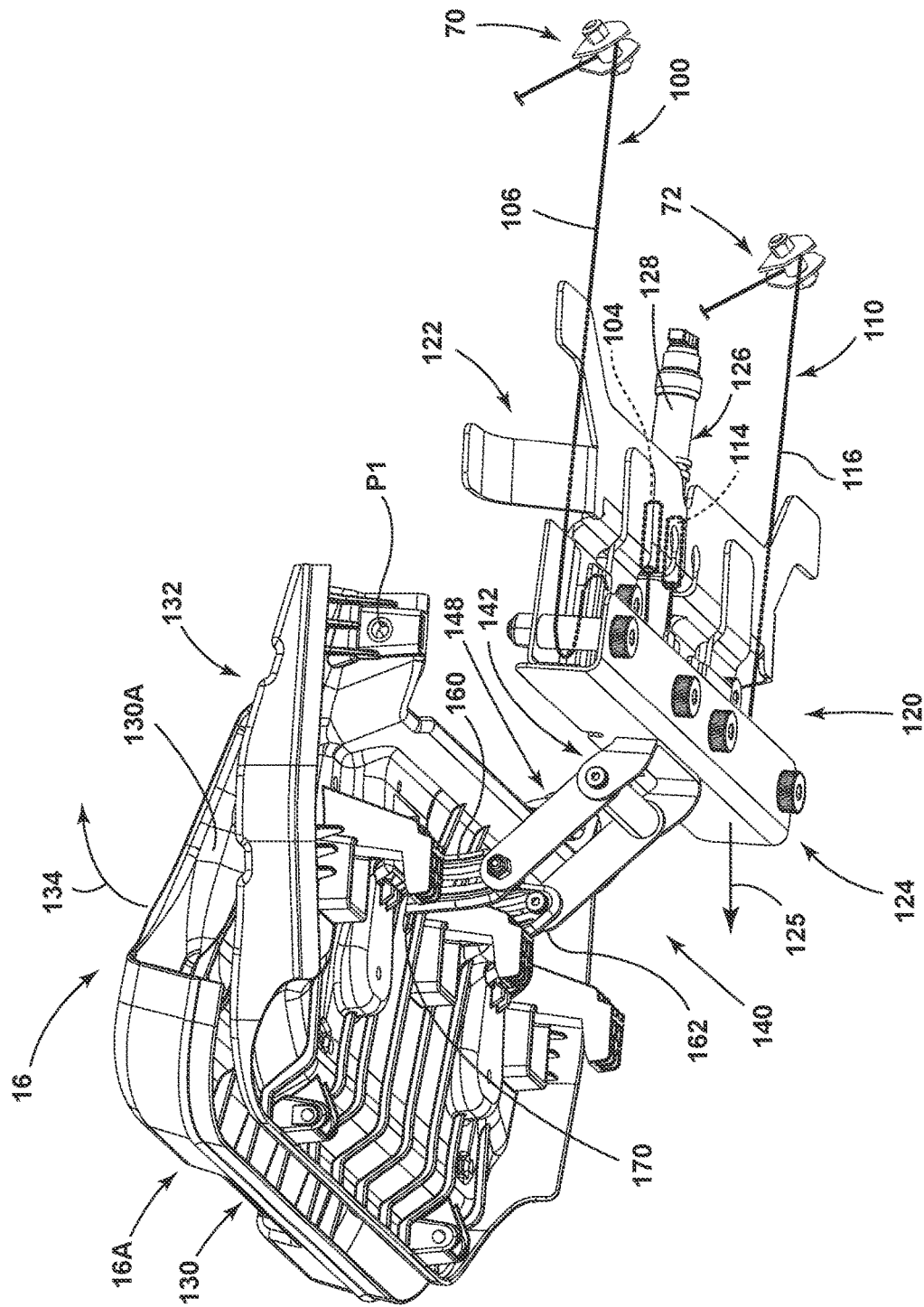
FIG. 7B is a bottom perspective view of the carrier assembly, displaceable platform and retraction mechanism of FIG. 7A showing movement of the displaceable platform to an intermediate position and movement of the second bracket of the retraction mechanism to an intermediate position.
Figure 7C:
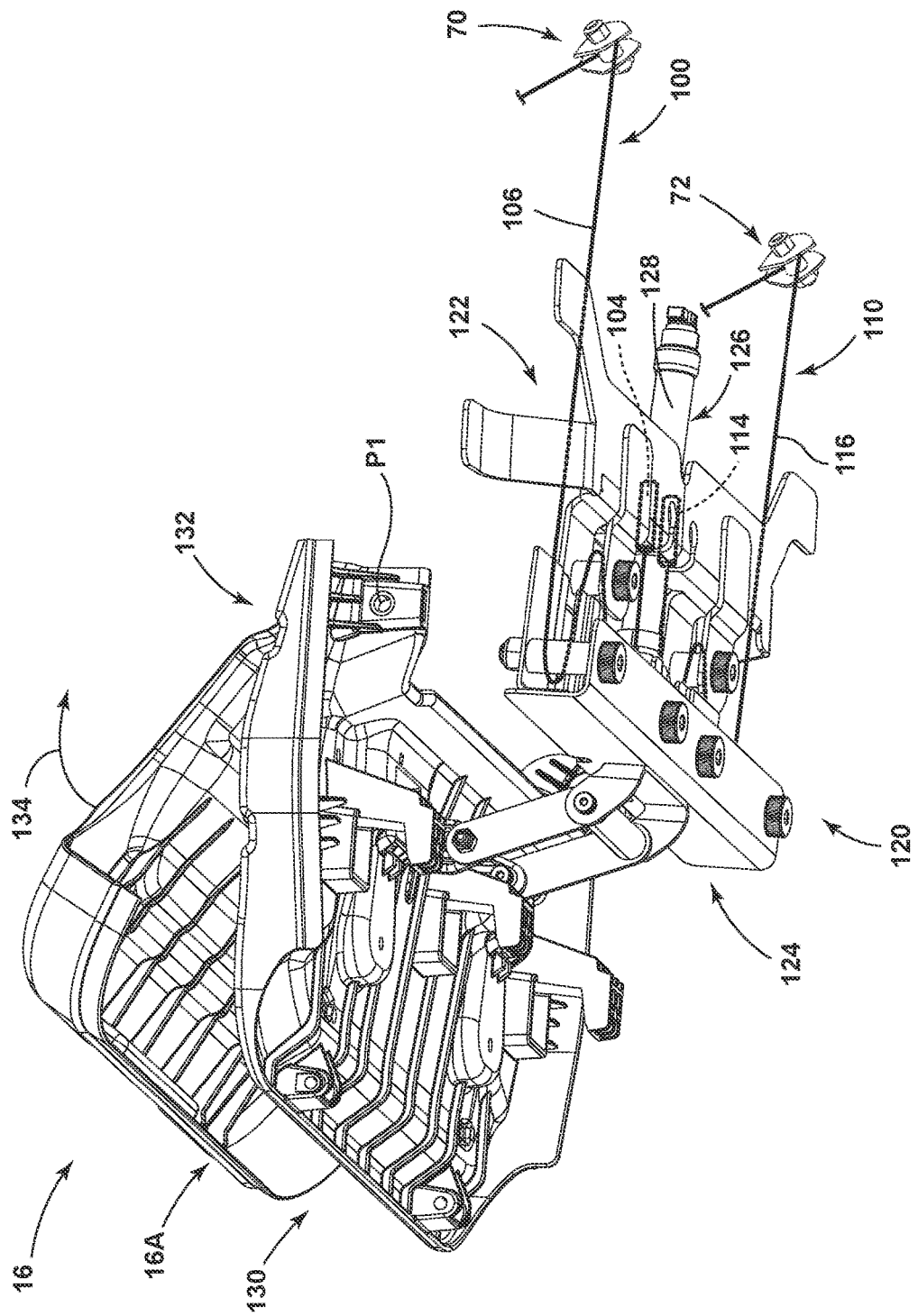
FIG. 7C is a bottom perspective view of the carrier assembly, displaceable platform and retraction mechanism of FIG. 7B showing movement of the displaceable platform to an deployed position and movement of the second bracket of the retraction mechanism to a second position.

Referring now to FIG. 7A, the retraction mechanism 120 is shown having first and second brackets 122, 124. The first bracket 122 is configured to couple to the frame assembly 17 (FIG. 9) of the seat portion 16. In this way, it is contemplated that the first bracket 122 is retained in a fixed location during operation of the retraction mechanism 120. The second bracket 124 is operably coupled to the first bracket 122 by an actuator 126. The second bracket 124 is contemplated to be moveably associated with the first bracket 122. As such, the second bracket 124 is configured for movement between first and second positions. In FIG. 7A, the second bracket 124 is shown in the first position. The actuator 126 is configured to actuate the second bracket 124 to the second position as shown in FIG. 7C and further described below. The second bracket 124 is further coupled to a displaceable platform 130. The displaceable platform 130 is operably coupled to a carrier assembly 132 provided at the front portion 16A of the seat portion 16. Specifically, the displaceable platform 130 is pivotally coupled to the carrier assembly 132 at pivot locations P1, P2 (FIG. 9) for upward and rearward rotation along the path as indicated by arrow 134. This pivoting movement of the displaceable platform 130 provides for the upward movement of the front portion 16A of the seat portion 16 during the retraction of the belt member 60, as shown in FIG. 6.

As further shown in FIG. 7A, the first and second tether members 100, 110 are shown associated with the first and second routing mechanisms 70, 72, respectively. The first tether member 100 includes a second end 104 which is operably coupled to the first bracket 122 of the retraction mechanism 120. Similarly, the second tether member 110 includes a second end 114 which is operably coupled to the first bracket 122 of the retraction mechanism 120. The respective body portions 106, 116 of the first and second tether members 100, 110 are operably coupled between the first and second brackets 122, 124 of the retraction mechanism 120 for movement therewith. Specifically, as the second bracket 124 moves to the second position (FIG. 7C), the respective first ends 102, 112 of the first and second tether members 100, 110 are drawn toward the first and second routing mechanisms 70, 72, respectively, to retract the belt member 60. As such, the second bracket 124 moves away from the first bracket 122 in a linear manner when the second bracket 124 moves from the first position to the second position, as indicated by arrow 125 (FIGS. 7B, 7C). The movement of the second bracket 124 between first and second positions relative to the first bracket 122 provides for the retraction of the belt member 60. This retraction of the belt member 60 by the retraction mechanism 120 is further described below.

As further shown in FIG. 7A, the actuator 126 is shown in the form of a piston assembly 128 that is contemplated to be operable between at-rest and extended positions. With the actuator 126 in the at-rest position, the second bracket 124 is in the first position. When the actuator 126 or piston assembly 128 moves from the at-rest position to the extended position, the second bracket 124 moves from the first position (FIG. 7A) to the second position (FIG. 7C).

In FIGS. 7A-7C, relative motion of the retraction mechanism 120 is shown, which correlates to the upward pivoting motion of the displaceable platform 130. Specifically, the second bracket 124 of the retraction mechanism 120 is operably coupled to the displaceable platform 130 by a linkage system 140. The linkage system 140 includes a first link 142 coupled to the second bracket 124. The first link 142 includes first and second arms 144, 146 that outwardly extend from the second bracket 124. The first and second arms 144, 146 are pivotally coupled to a second link 148, at first and second arms 150, 152 thereof. Specifically, the first and second arms 144, 146 of the first link 142 are coupled to the first and second arms 150, 152 of the second link 148 at respective first ends 150A, 152A thereof. A support rod 154 is positioned between the first and second arms 144, 146 of the first link 142 and the first and second arms 150, 152 of the second link 148, at the respective first ends 150A, 152A thereof. The first and second arms 150, 152 of the second link 148 further include respective second ends 150B, 152B. The first and second arms 150, 152 of the second link 148 outwardly extend and are operably coupled to first and second support members 160, 162 at the respective second ends 150B, 152B of the first and second arms 150, 152 of the second link 148. The first and second support members 160, 162 downwardly extend from an underside 130A (FIG. 7C) of the displaceable platform 130. Specifically, the first and second support members 160, 162 of the displaceable platform 130 downwardly extend through access apertures 170, 172 (FIG. 9) disposed through the carrier assembly 132. With the linkage system 140 operably coupled to the first and second support members 160, 162 of the displaceable platform 130, the retraction mechanism 120 can push the second bracket 124 thereof outward in a linear manner, as indicated by arrow 125 (FIGS. 7B, 7C) and translate that linear motion through the linkage system 140 to the upward pivoting motion of the displaceable platform 130 between the use and deployed positions thereof.

Referring now to FIG. 7B, the second bracket 124 of the retraction mechanism 120 is shown in an intermediate position between the first position, as shown in FIG. 7A, and the second position, as shown in FIG. 7C. In the intermediate position, the second bracket 124 of the retraction mechanism 120 has moved outwardly along the path indicated by arrow 125 away from the first bracket 122. This outward motion of the second bracket 124 of the retraction mechanism 120 provides for the upward motion of the displaceable platform 130 along the path as indicated by arrow 134, as shown in FIG. 7B. In FIG. 7A, the displaceable platform 130 is illustrated in a use position. In FIG. 7B, the displaceable platform 130 is illustrated in an intermediate position, that is provided between the use position and a deployed position. Further, this outward motion of the second bracket 124 of the retraction mechanism 120 away from the first bracket 122 provides for the retraction of the first and second tether members 100, 110, which further provides for the retraction of the belt member 60.

Referring now to FIG. 7C, the second bracket 124 of the retraction mechanism 120 is shown in the second position. In the second position, the second bracket 124 of the retraction mechanism 120 has further moved outwardly along the path indicated by arrow 125 away from the first bracket 122 to finally reach the second position. With the second bracket 124 fully positioned in the second position, the displaceable platform 130 is illustrated in the deployed position. The displaceable platform 130 is moved to the deployed position by the second bracket 124 acting on the linkage system 140 to push the first and second support members 160, 162 upward to provide an upward rotating movement of the displaceable platform 130. The upward rotating movement of the displaceable platform 130 provides for the front portion 16A of the seat portion 16 to be raised in an effort to assist in seat occupant management, as shown in FIG. 6. Further, the outward motion of the second bracket 124 of the retraction mechanism 120 to the second position provides for the retraction of the first and second tether members 100, 110, and the belt member 60, such that the belt member 60 is in the fully retracted position when the second bracket 124 of the retraction mechanism 120 is in the second position.

Figure 8A:
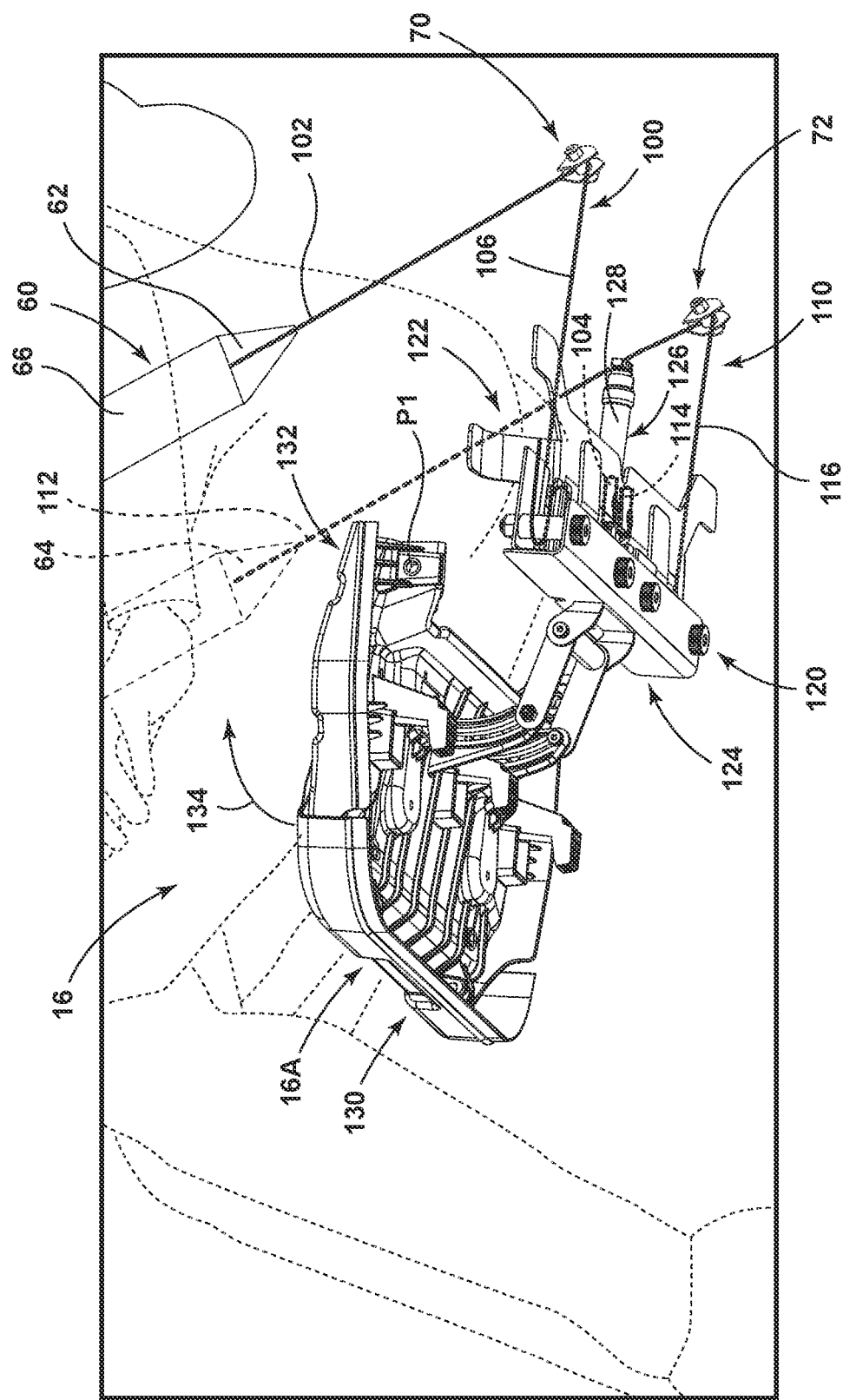
FIG. 8A is a bottom perspective view of the carrier assembly, displaceable platform and retraction mechanism of FIG. 7A with a belt member deployed about a seat occupant.
Figure 8B:
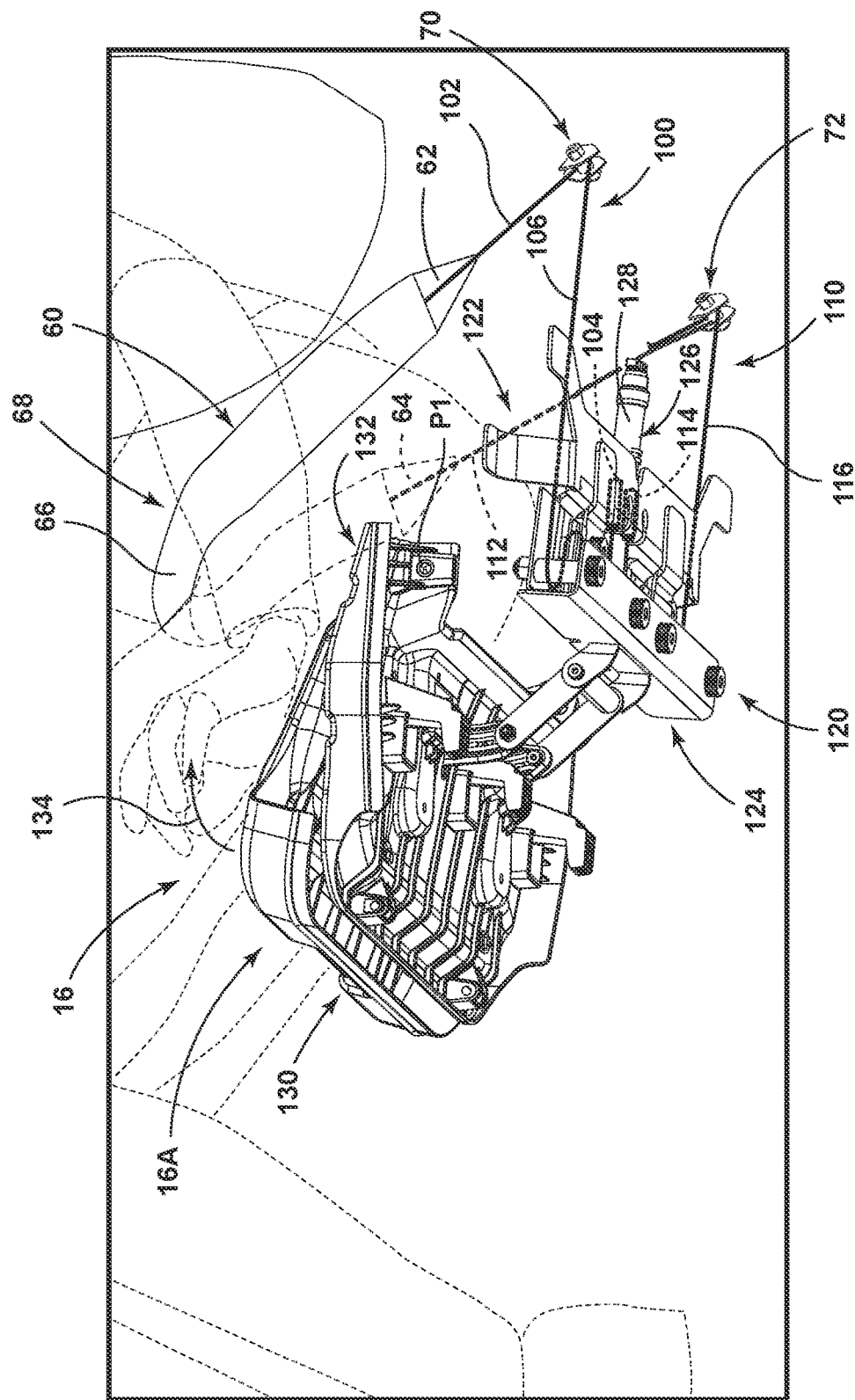
FIG. 8B is a bottom perspective view of the carrier assembly, displaceable platform and retraction mechanism of FIG. 7B with the belt member being retracted towards the seat occupant.
Figure 8C:
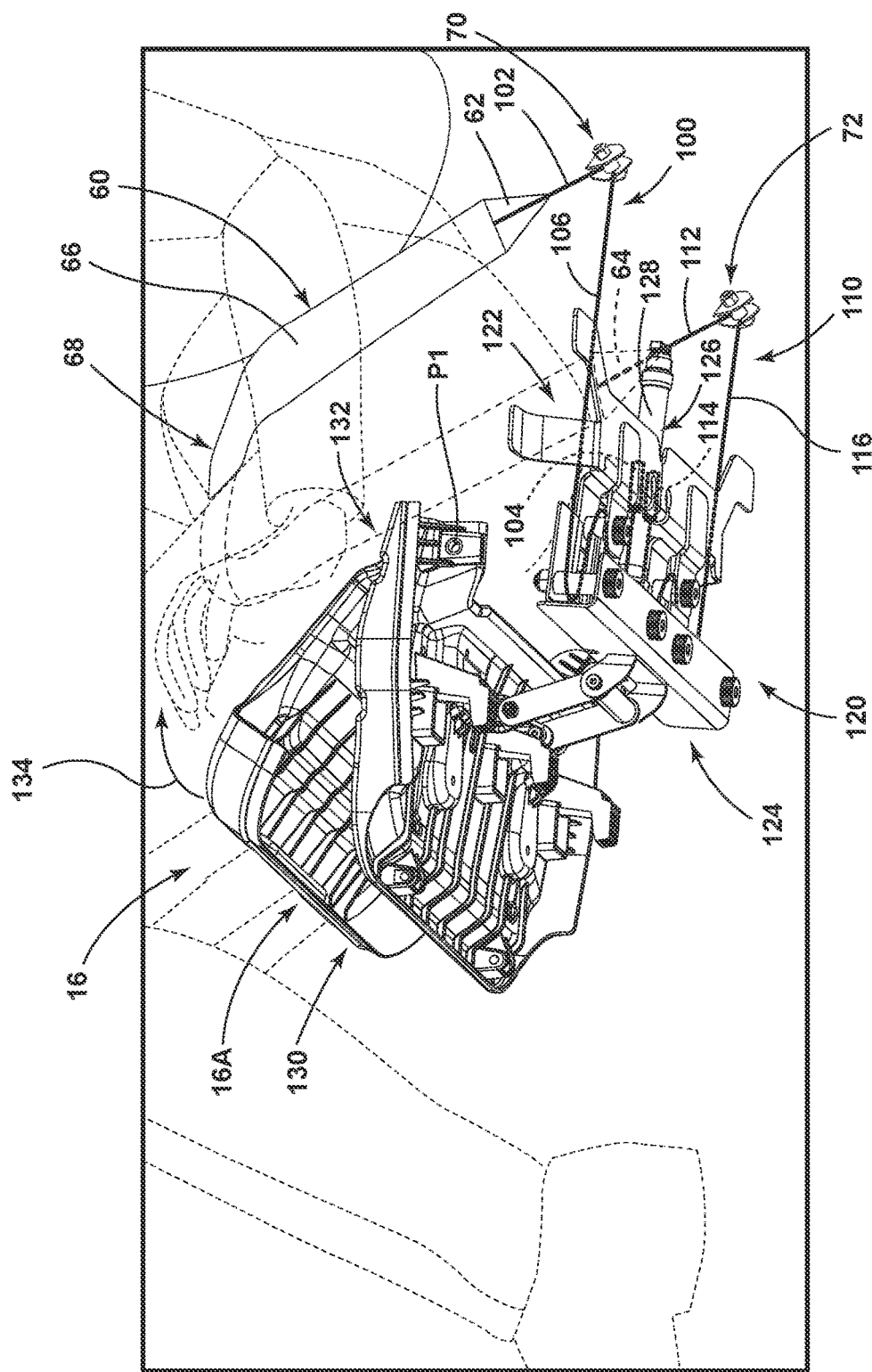
FIG. 8C is a bottom perspective view of the carrier assembly, displaceable platform and retraction mechanism of FIG. 7C with the belt member in a fully retracted position.

Referring now to FIGS. 8A-8C, the belt member 60 of the belt assembly 68 is shown as being deployed over the seat occupant 90 to surround the seat occupant 90. Specifically, in FIGS. 8A-8C, the belt member 60 is contemplated to be deployed with the airbag assembly 50, such that a portion of the belt member 60 is shown in phantom in FIGS. 8A-8C to illustrate that the belt member 60 surrounds the opposed sides the seat occupant 90. From FIGS. 8A-8C, the second bracket 124 of the retraction mechanism 120 moves from the first position to the second position. This movement of the second bracket 124 causes the displaceable platform 130 to move from the use position to the deployed position. Further, this movement of the second bracket 124 provides for the retraction of the first and second tether members 100, 110 along opposed sides of the seat portion 16, which further provides for retraction of the belt member 60 of the belt assembly 68 around the seat occupant 90. Thus, the first and second tether members 100, 110 are shown in the deployed positions in FIG. 8A, and retracted positions in FIG. 8C. The first and second tether members 100, 110 are shown in intermediate positions between the deployed positions and retracted positions in FIG. 8B.

Figure 9:
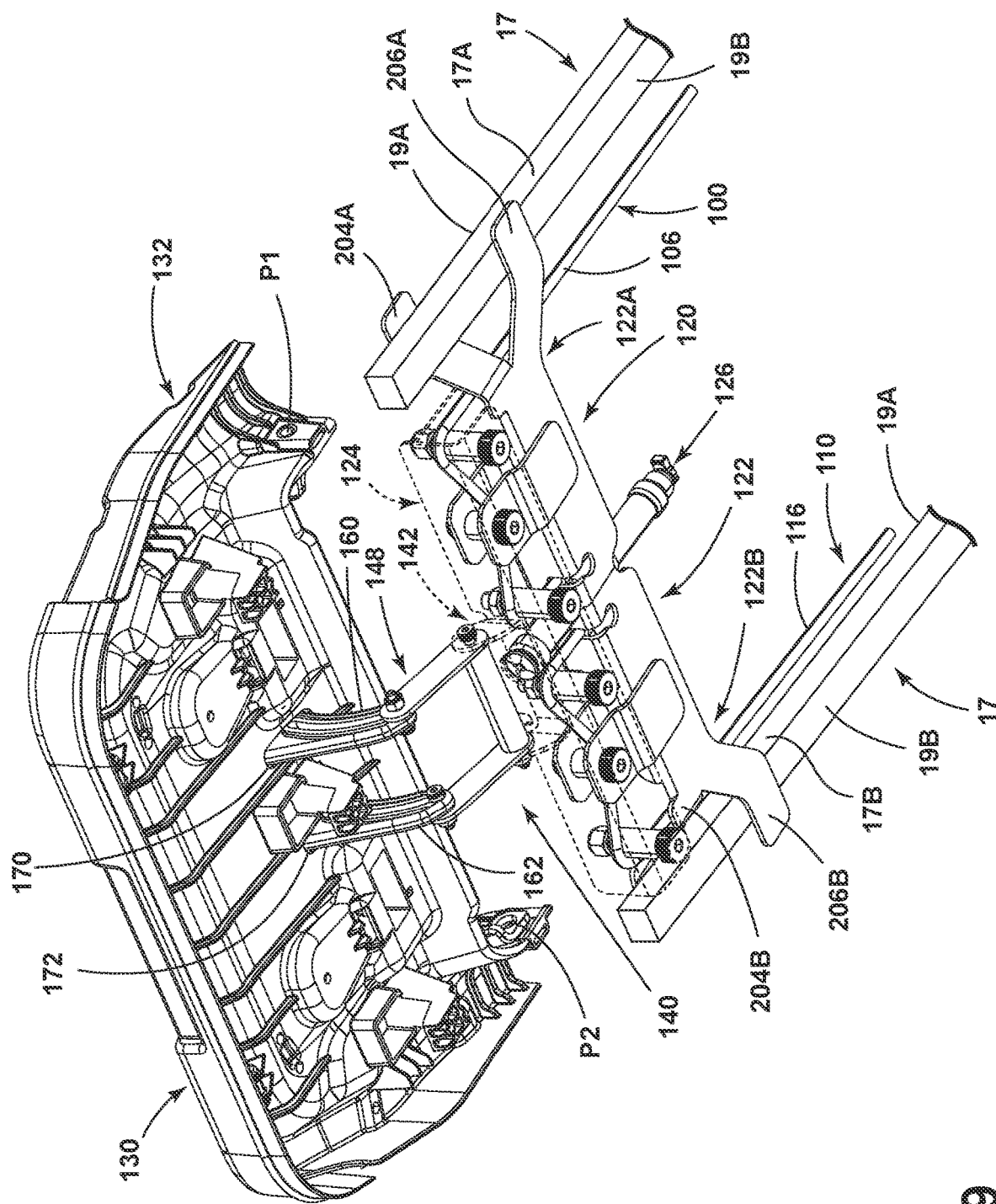
FIG. 9 is a bottom perspective view of a carrier assembly with a displaceable platform in an at-rest position as coupled to a retraction mechanism having a second bracket in a first position.

Referring now to FIG. 9, the first and second pivot locations P1, P2 provided between the displaceable platform 130 and the carrier assembly 132 are shown. Further, the access apertures 170, 172 provided through the carrier assembly 132 are also shown as slideably receiving the first and second support members 160, 162 which extend downwardly from the underside 130A (FIG. 7C) of the displaceable platform 130. As further shown in FIG. 9, the frame assembly 17 of the seat portion 16 includes frame members 17A, 17B which are spaced-apart from one another. As shown in FIG. 9, the frame members 17A, 17B of the frame assembly 17 are coupled to the first bracket 122 at opposed first and second sides 122A, 122B thereof. The frame members 17A, 17B each include upper and lower portions 19A, 19B that are vertically offset from one another. In this way, the frame members 17A, 17B can couple to respective upper and lower connection arms 204A, 206A and 204B, 206B of the first bracket 122 of the retraction mechanism 120 to retain the first bracket 122 of the retraction mechanism 120 in-place on the seat assembly 10. The retraction mechanism 120 can also be disposed within the interior portion 28 of the seatback 18, as further described below with reference to FIGS. 18A, 18B.

The retraction of the first and second tether members 100, 110 will now be discussed with specific reference to FIGS. 10-14C.

Figure 10:
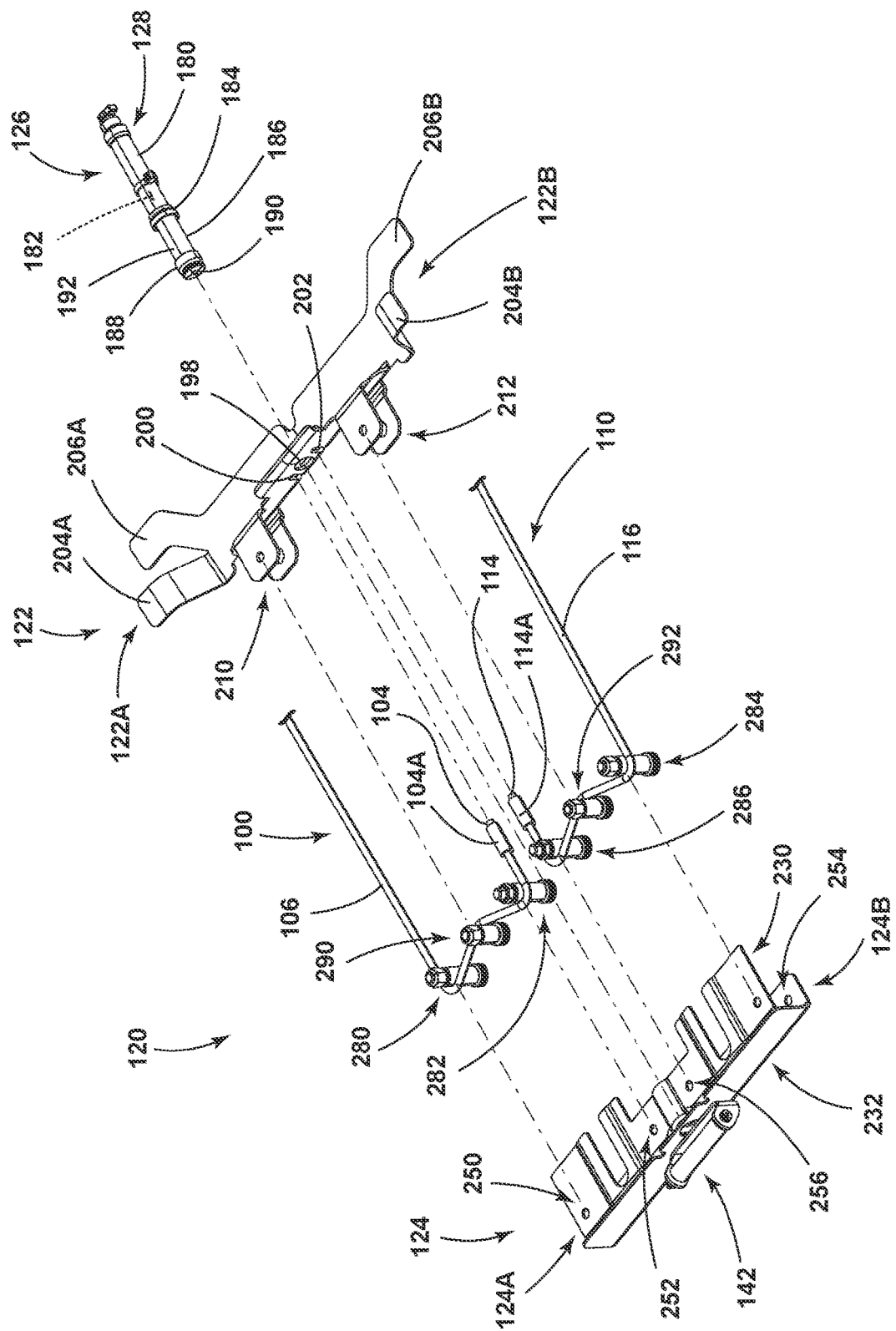
FIG. 10 is an exploded top perspective of a retraction mechanism.

Referring now to FIG. 10, the retraction mechanism 120 is shown in a top exploded view. In FIG. 10, the actuator 126 is shown in the form of a piston assembly 128 having a housing 180 surrounding an interior cavity 182 and having a connection location 184. The actuator 126 further includes a rod 186 having a connection location 188 disposed at a distal end 190 thereof. The rod 186 includes a body portion 192 that is slidably received within the interior cavity 182 of the housing 180. In this way, the rod 186 is operable between at-rest and extended positions relative to the housing 180. In assembly, the housing 180 of the actuator 126 is configured to couple to the first bracket 122 at the connection location 184. The rod 186 is configured to couple to the second bracket 124 at the connection location 188. In this way, the actuator 126 is used to move the second bracket 124 of the retraction mechanism 120 from the first position to the second position as the rod 186 moves from the at-rest position to the extended position. Movement of the rod 186 from the at-rest position to the extended position may be referred to herein as the actuator 126 moving from an at-rest position to an actuated position.

Referring now to FIGS. 11A and 11B, the first bracket 122 of the retraction mechanism 120 is shown from front and rear top perspective views. In FIGS. 11A and 11B, the first bracket 122 is shown as having a body portion 194 with an upwardly turned front portion 196. On the upwardly turned front portion 196, a connection aperture 198 is shown centrally disposed. Connection slots 200, 202 are disposed on opposite sides of the connection aperture 198. The connection slots 200, 202 are disposed along the body portion 194 and the upwardly turned front portion 196 thereof, as best shown in FIG. 11B. The connection slots 200, 202 include respective openings 200A, 202A (FIG. 11B) for respectively receiving cable end assemblies 104A, 114A (FIG. 10) of the first and second tether members 100, 110. In this way, the connection slots 200, 202 define keyhole slots that are configured to releasably couple the cable end assemblies 104A, 114A thereto. In use, the centrally disposed connection aperture 198 is configured to couple to the actuator 126 at connection location 184 (FIG. 10). The first bracket 122 of the retraction mechanism 120 further includes upper and lower connection arms 204A, 206A and 204B, 206B disposed on opposed first and second sides 122A, 122B of the first bracket 122. As best shown in FIG. 9, the upper and lower connection arms 204A, 206A and 204B, 206B are configured to couple to frame members 17A, 17B of the frame assembly 17 of the seat portion 16 at respective upper and lower portions 19A, 19B thereof. Thus, the upper and lower connection arms 204A, 206A and 204B, 206B each include respective distal ends 205A, 207A and 205B, 207B, wherein the distal ends 205A and 207A disposed on the first side 122A of the first bracket 122 are vertically spaced-apart from one another, and further wherein the distal ends 205B and 207B disposed on the second side 122B of the first bracket 122 are vertically spaced-apart from one another. The connection of the upper and lower connection arms 204A, 206A and 204B, 206B to the upper and lower portions (19A, 19B) of the respective frame members 17A, 17B helps to anchor the first bracket 122 of the retraction mechanism 120 to the frame assembly 17 (as shown in FIG. 9) and prevent twisting of the same when the actuator 126 is actuated and the second bracket 124 moves away from the first bracket 122.

As further shown in FIGS. 11A, 11B, the first bracket 122 of the retraction mechanism 120 further includes first and second connection assemblies 210, 212. Each of the first and second connection assemblies 210, 212 includes an upper tab 214 having a mounting aperture 216, and a lower tab 218 having a mounting aperture 220. In each of the first and second connection assemblies 210, 212, the upper tab 214 is vertically spaced-apart from the lower tab 218 to define a receiving space 222 therebetween. Further, the mounting aperture 216 of the upper tab 214 is aligned with the mounting aperture 220 of the lower tab 218 in each of the first and second connection assemblies 210, 212. In this way, the first and second connection assemblies 210, 212 are configured to receive respective routing column assemblies 290, 292 (FIG. 10) in the receiving spaces 222 thereof as further described below.

Figure 12A:
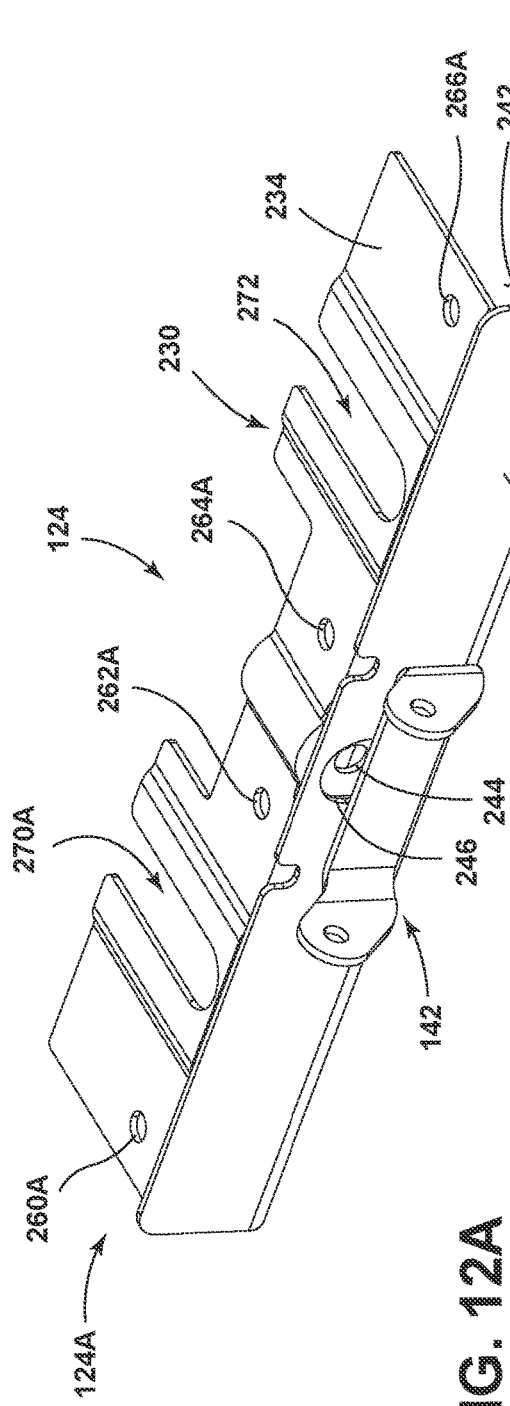
FIG. 12A is a front top perspective view of a second bracket of the retraction mechanism of FIG. 10.
Figure 12B:
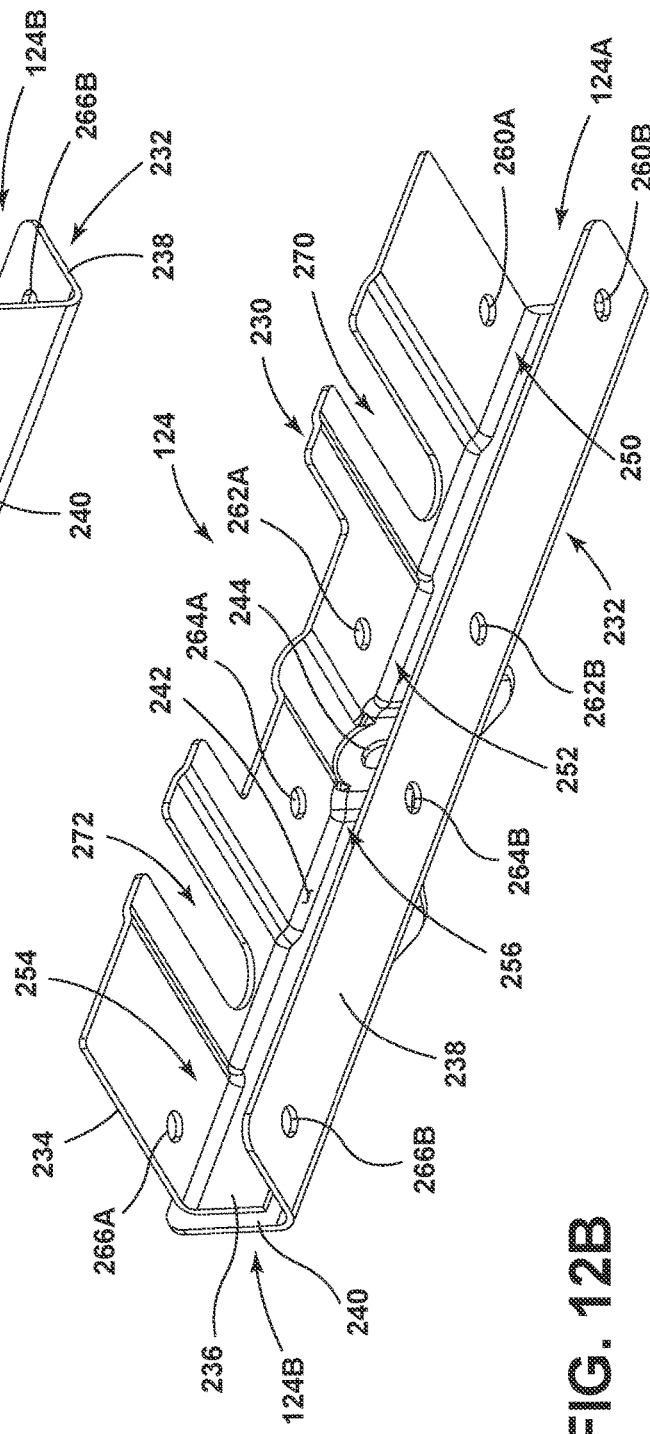
FIG. 12B is a rear bottom perspective view of the second bracket of FIG. 12A.

Referring now to FIGS. 12A and 12B, the second bracket 124 of the retraction mechanism 120 is shown from a front top perspective view and a rear bottom perspective view. In FIGS. 12A and 12B, the second bracket 124 is shown as having a first member 230 and a second member 232. The first member 230 includes first and second portions 234, 236 which are substantially horizontal and vertical portions, such that the first member 230 has a generally L-shaped configuration. Similarly, the second member 232 includes first and second portions 238, 240 which are substantially horizontal and vertical portions, such that the second member 232 also has a generally L-shaped configuration. The first and second members 230, 232 are coupled to one another at the respective second portions 236, 240 thereof, such that the respective first portions 234, 236 thereof are spaced-apart from one another to define a receiving area 242 therebetween. The second portions 236, 240 of the first and second members 230, 232 each include a connection aperture 244, 246, respectively. The connection apertures 244, 246 of the first and second members 230, 232 are aligned with one another and configured to couple the second bracket 124 to the actuator 126 at connection location 188 (FIG. 10) thereof. As best shown in FIG. 12A, the first link 142 of the linkage system 140 is shown coupled to the second portion 240 of the second member 232, such that the second portion 240 of the second member 232 defines a front portion of the second bracket 124.

As further shown in FIG. 12B, the second bracket 124 of the retraction mechanism 120 further includes first and second connection assemblies 250, 252 and 254, 256 associated with opposed first and second sides 124A, 124B of the second bracket 124. Each of the first and second connection assemblies 250, 252 and 254, 256 includes an upper mounting aperture and a lower mounting aperture. Specifically, the first connection assembly 250 associated with the first side 124A of the second bracket 124 includes an upper mounting aperture 260A and a lower mounting aperture 260B that are vertically aligned with one another and configured to receive a routing column assembly 280 (FIG. 10). The second connection assembly 252, also associated with the first side 124A of the second bracket 124, includes an upper mounting aperture 262A and a lower mounting aperture 262B that are vertically aligned with one another and configured to receive a routing column assembly 282 (FIG. 10). The first connection assembly 254 associated with the second side 124B of the second bracket 124 includes an upper mounting aperture 266A and a lower mounting aperture 266B that are vertically aligned with one another and configured to receive a routing column assembly 284 (FIG. 10). Finally, the second connection assembly 254 associated with the second side 124B of the second bracket 124 includes an upper mounting aperture 264A and a lower mounting aperture 264B that are vertically aligned with one another and configured to receive a routing column assembly 286 (FIG. 10). Thus, the first portion 234 of the first member 230 includes the upper mounting apertures 260A, 262A, 264A, 266A disposed therethrough, which are aligned with the lower mounting apertures 260B, 262B, 264B, 266B which are disposed through the first portion 238 of the second member 230 of the second bracket 124. In this way, the upper mounting apertures 260A, 262A, 264A, 266A are disposed on an opposite side of the receiving area 242 of the second bracket 124 relative to the lower mounting apertures 260B, 262B, 264B, 266B.

As further shown in FIGS. 12A, 12B, the second bracket 124 of the retraction mechanism 120 further includes first and second slots 270, 272 disposed through the first portion 234 of the first member 230. In use, the first and second slots 270, 272 are configured to receive the first and second routing column assemblies 290, 292 of the first bracket 122 of the retraction mechanism 120, as shown in FIG. 14A and further described below.

Referring again to FIG. 10, the first and second tether members 100, 110 are shown being routed through the various routing column assemblies of the retraction mechanism 120. Specifically, the first tether member 100 is shown having the body portion 106 thereof routed through the first routing column assembly 280 of the second bracket 124, the first routing column assembly 290 of the first bracket 122 and then through the second routing column assembly 282 of the second bracket 124. Similarly, the second tether member 110 is shown having the body portion 116 thereof routed through the first routing column assembly 284 of the second bracket 124, the second routing column assembly 292 of the first bracket 122 and then through the second routing column assembly 286 of the second bracket 124. In this way, the body portions 106, 116 of the first and second tether members 100, 110 are interlaced between the first and second brackets 122, 124 of the retraction mechanism 120. As used herein, the term "interlaced" describes a routing configuration in which a body portion of a tether member is routed to connection assemblies of the first and second brackets 122, 124 of the retraction mechanism 120 in an alternating fashion. This interlaced configuration of the first and second tether members 100, 110 is best shown in FIGS. 14A-14C.

Figure 13:
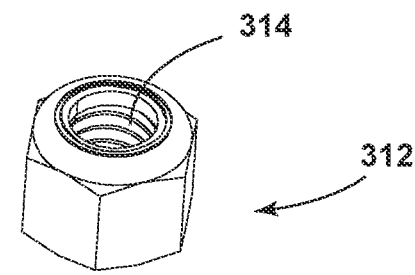
FIG. 13 is an exploded view of a routing column assembly of the retraction mechanism of FIG. 10.
Figure 13:
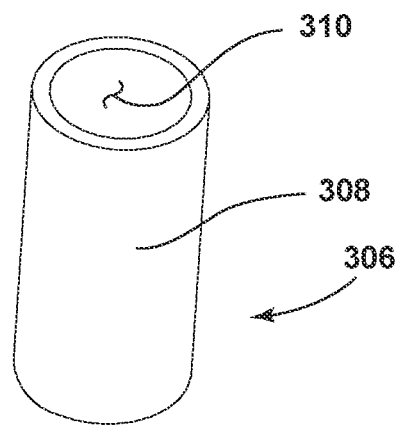
Figure 13:
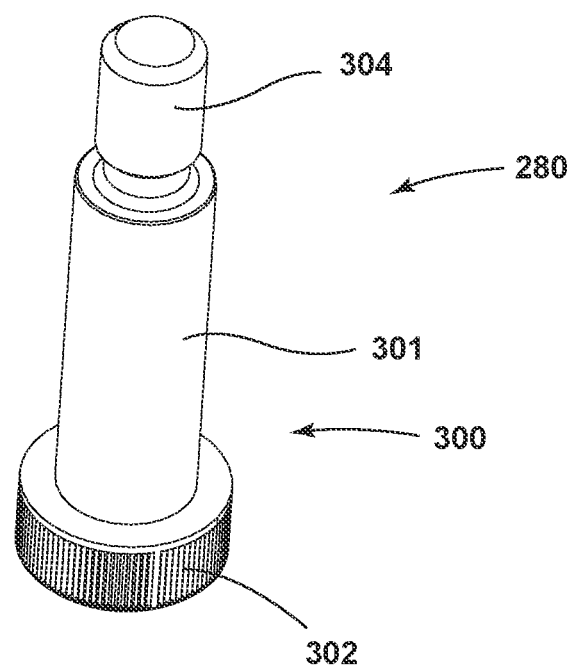

Referring now to FIG. 13, a routing column assembly 280 is shown and is contemplated to be an exemplary embodiment of all the routing column assemblies provided in the retraction mechanism 120. In FIG. 13, the routing column assembly 280 includes a mounting member 300 having a shaft member 301 upwardly extending from a head portion 302. A connection portion 304 of the mounting member 300 is disposed on an opposite end of the shaft number 301 relative to the head portion 302. A sleeve member 306 includes a body portion 308 which is a cylindrically-shaped portion surrounding a hollow interior portion 310. In assembly, the sleeve member 306 is configured to receive the shaft member 301 within the hollow interior portion 310 thereof. A connection member 312 is configured to be received on the connection portion 304 of the mounting member 300 to retain the sleeve member 306 on the shaft member 301 of the mounting member 300. The connection member 312 includes a threaded interior portion 314 which is contemplated to thread to the connection portion 304 of the mounting member 300. The connection member 316 is configured to abut an upper surface of the first portion 234 of the first member 230 of the second bracket 124 in assembly. Similarly, the head portion 302 of the mounting member 300 is configured to abut an outer surface of the first portion 238 of the second member 232 of the second bracket 124. In this way, the routing column assembly 280 is configured to interconnect the first portions 234, 238 of the first and second members 230, 232 of the second bracket 124. Further, it is contemplated that the sleeve member 306 can rotate on the shaft member 301 as received thereon. In assembly, a body portion of a tether member is configured to engage the sleeve member 306 as routed therealong. In this way, the routing column assembly 280 provides a low friction routing configuration for a tether member.

Figure 14A:
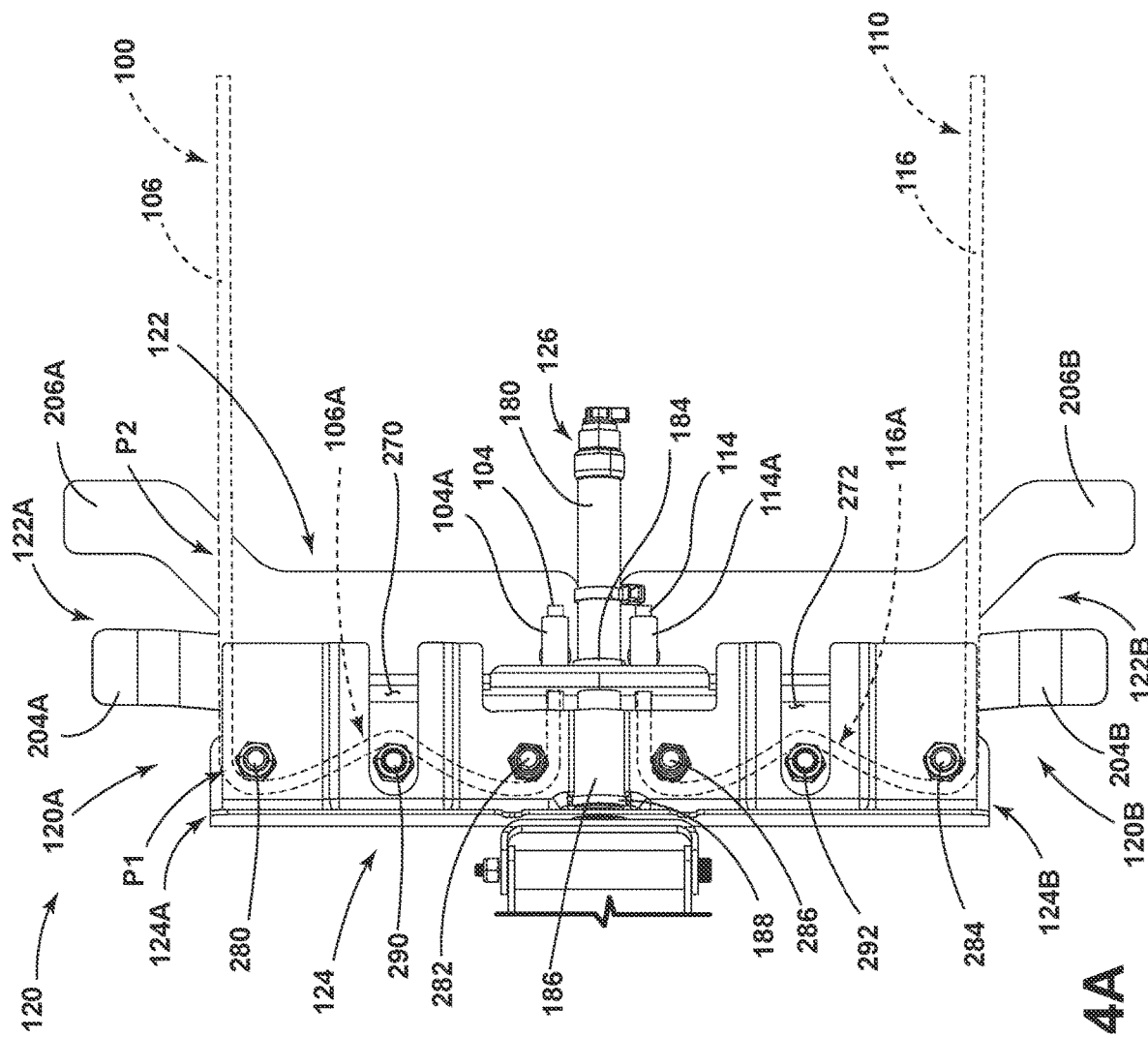
FIG. 14A is a top plan view of the retraction mechanism of FIG. 10 in an assembled condition with the second bracket of the retraction mechanism shown in a first position.
Figure 14B:
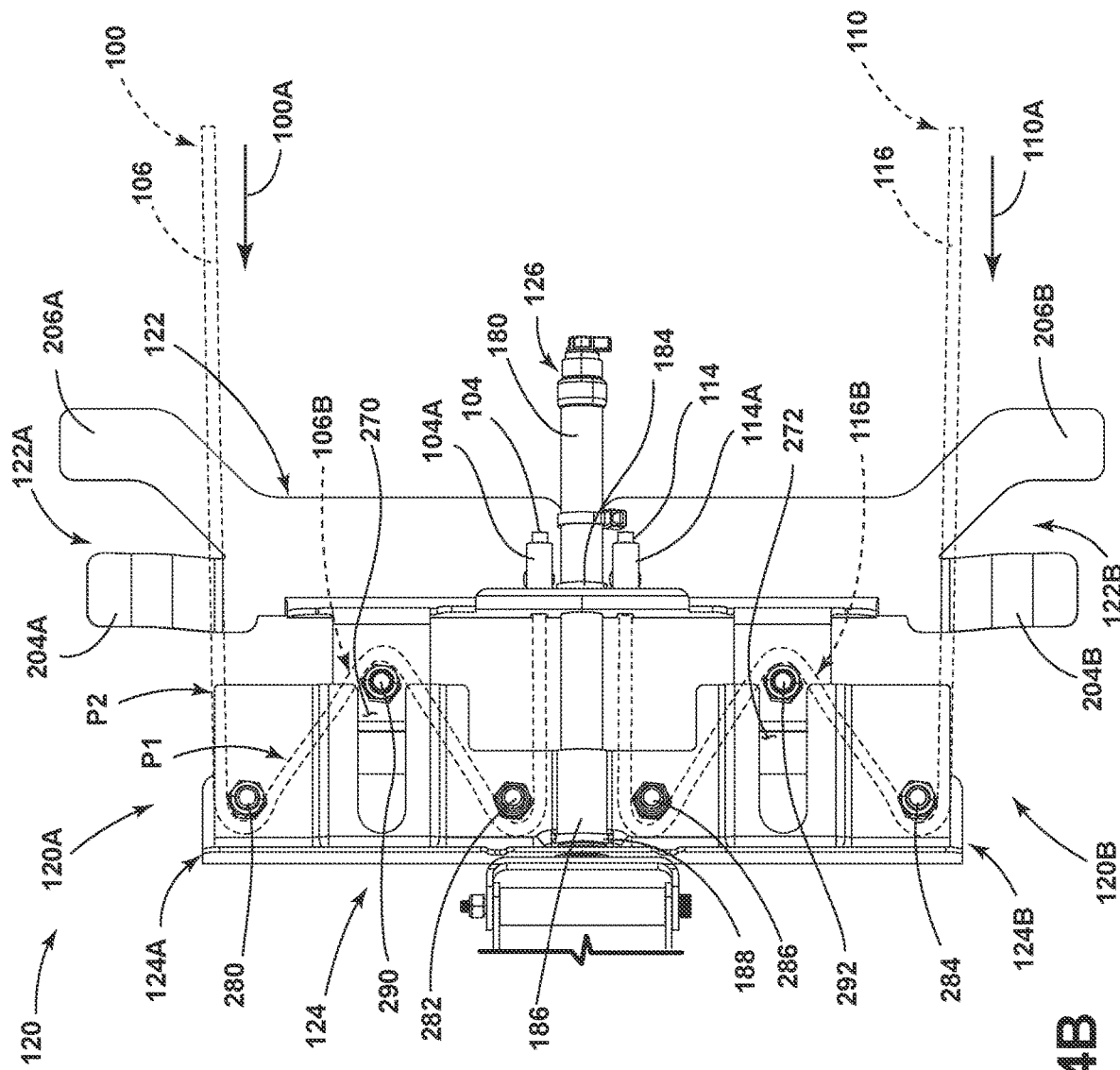
FIG. 14B is a top plan view of the retraction mechanism of FIG. 14A with the second bracket of the retraction mechanism shown in an intermediate position.
Figure 14C:
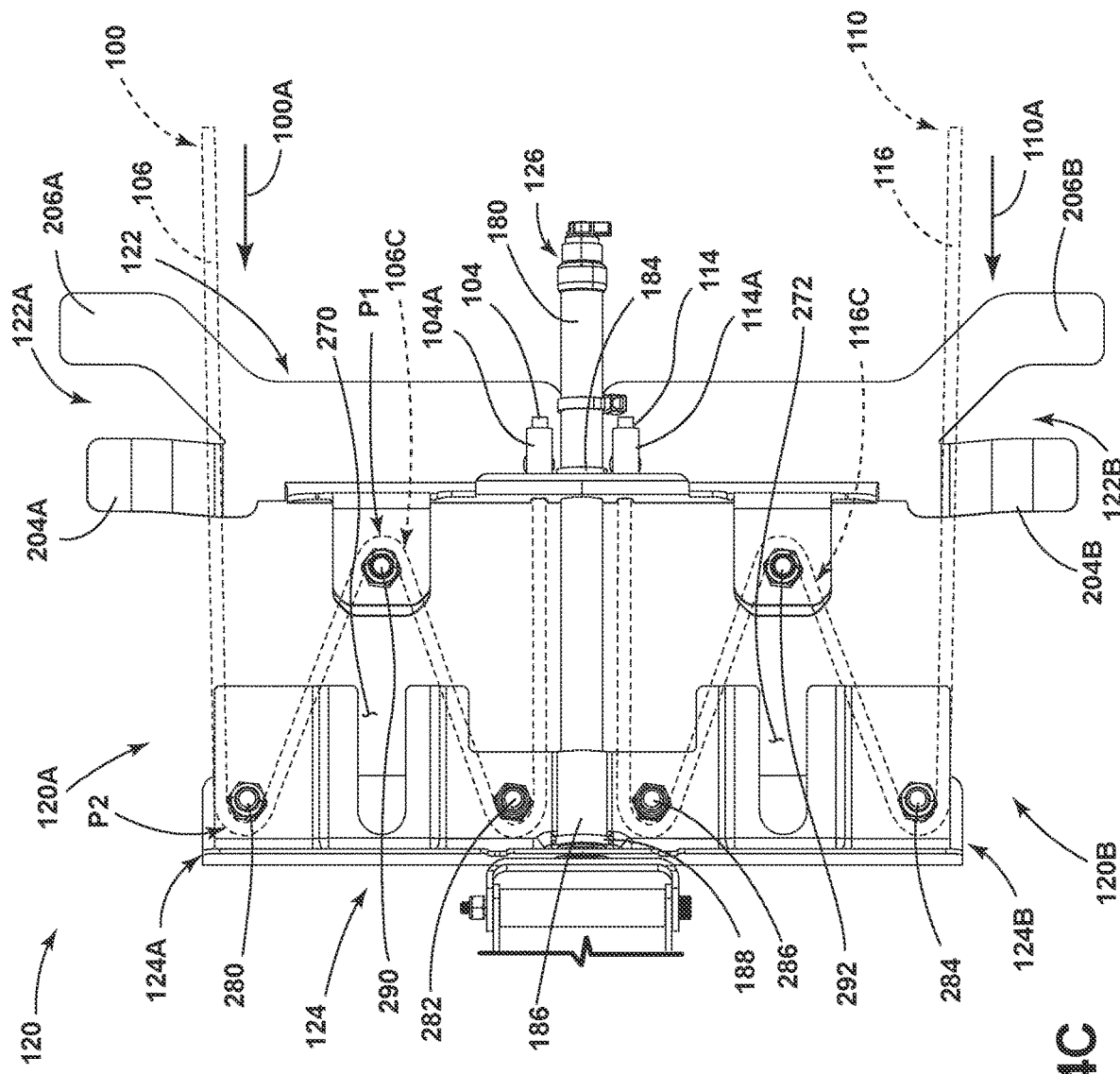
FIG. 14C is a top plan view of the retraction mechanism of FIG. 14B with the second bracket of the retraction mechanism shown in a second position.

Referring now to FIGS. 14A-14C, the retraction of the first and second tether members 100, 110 by the retraction mechanism 120 is illustrated. As shown, the retraction mechanism 120 includes first and second sides 120A, 120B that are opposed to one another. The first tether member 100 is coupled to the first side 120A of the retraction mechanism 120, while the second tether member 110 is coupled to the second side 120B of the retraction mechanism 120. Specifically, with reference to FIG. 14A, the retraction mechanism 120 is shown with the second bracket 124 thereof in the first position. In the first position, the second bracket 124 is disposed adjacent to the first bracket 122. With the second bracket 124 in the first position, the actuator 126 is in the at-rest position. With specific reference to the first tether member 100, the body portion 106 thereof is shown routed through the first routing column assembly 280 of the second bracket 124, and then routed through the first routing column assembly 290 of the first bracket 122, and then finally routed through the second routing column assembly 282 of the second bracket 124, and until the body portion 106 terminates at the second end 104 of the first tether member 100 which is shown connected to the first bracket 122 at cable end assembly 104A. Similarly, the second tether member 110 is shown having the body portion 116 thereof routed through the first routing column assembly 284 of the second bracket 124, and then routed through the second routing column assembly 292 of the first bracket 122, and then finally routed through the second routing column assembly 286 of the second bracket 124, and until the body portion 116 of the second tether member 110 terminates at the second end 114 thereof which is shown connected to the first bracket 122 at the cable end assembly 114A. As the cable end assemblies 104A, 114A of the first and second tether members 100, 110 are coupled to the first bracket 122, the first and second tether members 100, 110 retract as the second bracket 124 moves towards the second position, away from the first bracket 122 of the retraction mechanism 120. This retraction of the first and second tether members 100, 110 is due to the interlaced routing configuration of the first and second tether members 100, 110 between the first and second brackets 122, 124 of the retraction mechanism 120. In FIG. 14A, the retraction mechanism 120 is shown in the same position as illustrated in FIGS. 7A and 8A, such that the displaceable platform 130 is contemplated to be in the use position also shown in FIGS. 7A and 8A.

As shown in FIG. 14A, the first and second slots 270, 272 disposed through the first portion 234 of the first member 230 of the second bracket 124 of the retraction mechanism 120 are shown as receiving the first and second routing column assemblies 290, 292, respectively, of the first bracket 122 of the retraction mechanism 120.

With specific reference to FIG. 14B, the retraction mechanism 120 is shown with the second bracket 124 provided in an intermediate position between the first position (FIG. 14A) and the second position (FIG. 14C). Thus, in FIG. 14B, the actuator 126 has moved from the at-rest position (FIG. 14A) towards the actuated position (FIG. 14C). As such, in FIG. 14B, the first and second tether members 100, 110 have been retracted along the paths as indicated by arrows 100A, 110A, respectively. Thus, in FIG. 14B, the retraction mechanism 120 is shown in the same position as illustrated in FIGS. 7B and 8B, such that the displaceable platform 130 is contemplated to be in a raised position relative to the use position shown in FIGS. 7A and 8A. Further, the belt member 60 is contemplated to be in a partially retracted position as illustrated in FIG. 8B.

With specific reference to FIG. 14C, the retraction mechanism 120 is shown with the second bracket 124 provided in the second position. As such, in FIG. 14C, the first and second tether members 100, 110 have been fully retracted along the paths as indicated by arrows 100A, 110A, respectively. Thus, in FIG. 14C, the retraction mechanism 120 is shown in the same position as illustrated in FIGS. 7C and 8C, such that the displaceable platform 130 is contemplated to be in the deployed position relative to the use position shown in FIGS. 7A and 8A. Further, the belt member 60 is contemplated to be in a fully retracted position as illustrated in FIG. 8C, due to the retraction of the first and second tether members 100, 110.

As the second bracket 124 of the retraction mechanism 120 moves away from the first bracket 122, the body portions 106, 116 of the first and second tether members 100, 110 are drawn into the interlaced configuration between the first and second brackets 122, 124 of the retraction mechanism 120. Said differently, a first portion 106A of the body portion 106 of the first tether member 100 is interlaced between the first routing column assembly 290 of the first bracket 122 of the retraction mechanism 120, and the first and second routing column assemblies 280, 282 of the second bracket 124 of the retraction mechanism 120 when the actuator 126 is in the at-rest position, as shown in FIG. 14A. The first portion 106A of the body portion 106 of the first tether member 100 is contemplated to be measured from the second end 104 of the first tether member 100 to portion P1 indicated at the first routing column assembly 280 in FIG. 14C. Conversely, a second portion 106C of the body portion 106 of the first tether member 100 is interlaced between the first routing column assembly 290 of the first bracket 122 of the retraction mechanism 120, and the first and second routing column assemblies 280, 282 of the second bracket 124 of the retraction mechanism 120 when the actuator 126 is in the actuated position, as shown in FIG. 14C. The second portion 106C of the body portion 106 of the first tether member 100 is contemplated to be measured from the second end 104 of the first tether member 100 to portion P2 indicated at the first routing column assembly 280 in FIG. 14C. The second portion 106C (FIG. 14C) of the body portion 106 of the first tether member 100 that is interlaced between the first and second brackets 122, 124 of the retraction mechanism 120 is a longer portion than the first portion 106A (FIG. 14A) of the body portion 106 of the first tether member 100 that is interlaced between the first and second brackets 122, 124 of the retraction mechanism 120. This is because the body portion 106 of the first tether member 100 is drawn into the interlaced configuration between the first and second brackets 122, 124 of the retraction mechanism 120, as the second bracket 124 moves from the first position to the second position. This increasing length of the body portion 106 of the first tether member 100 interlaced between the first and second brackets 122, 124 of the retraction mechanism 120 is represented by reference numerals 106A (FIG. 14A), 106B (FIG. 14B), and 106C (FIG. 14C). Said differently, the first portion 106A of the body portion 106 of the first tether member 100 is shorter than the second portion 106B of the body portion 106 of the first tether member 100. Similarly, the increasing length of the body portion 116 of the second tether member 110 interlaced between the first and second brackets 122, 124 of the retraction mechanism 120 is represented by reference numerals 116A (FIG. 14A), 116B (FIG. 14B), and 116C (FIG. 14C).

It is contemplated that the actuator 126 may include a pyrotechnic device for generating gas pressure that urges the second bracket 124 of the retraction mechanism 120 away from the first bracket 122 of the retraction mechanism 120. The actuator 126, as powered by such a pyrotechnic device, would not only move the first and second brackets 122, 124 of the retraction mechanism 120 apart, but would also urge the displaceable platform 130 to the deployed position from the at-rest position in so doing. When a pyrotechnic charge is fired, a large volume of gas is rapidly produced within the housing 180 (FIG. 10), which can cause the rod 186 to rapidly extend out of the housing 180. In this way, the second bracket 124 of the retraction mechanism 120 will rapidly move apart from the first bracket 122, as the actuator 126 is operably coupled between the first and second brackets 122, 124 of the retraction mechanism 120.

Figure 15:
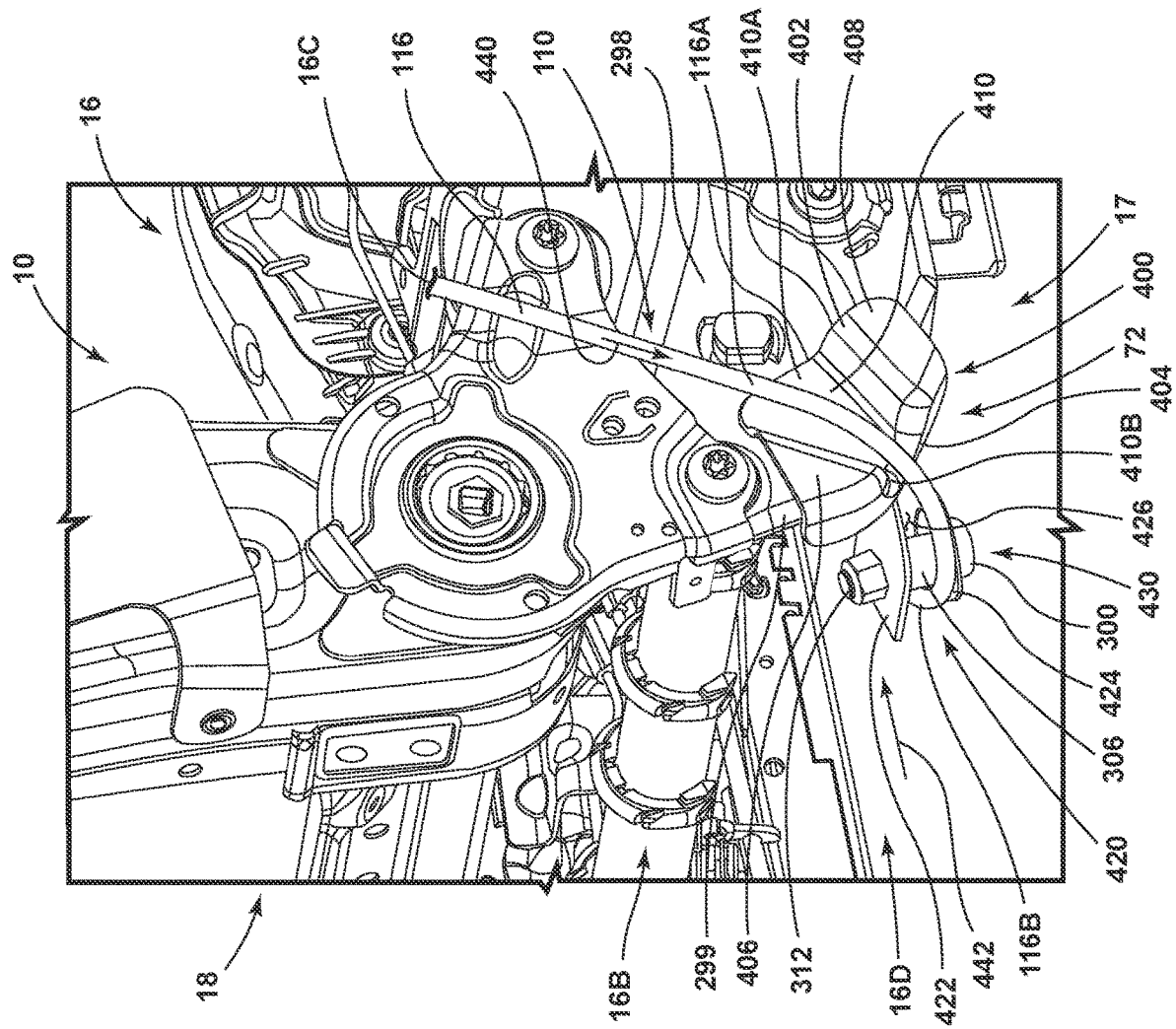
FIG. 15 is a top perspective view of a routing mechanism routing a tether member along a seat frame.

Referring now to FIG. 15, the second routing mechanism 72 is shown coupled to the frame assembly 17 of the seat portion 16 near the rear portion 16B of the seat portion 16. The description of the second routing mechanism 72 provided herein is meant to also describe the first routing mechanism 70 (FIGS. 5-6), which has a reverse configuration relative to the second routing mechanism 72 as positioned on an opposite side of the seat portion 16. As shown in FIG. the second routing mechanism 72 includes a plate member 400 having a first portion 402 and a second portion 404, wherein the second portion 404 extends inwardly from the first portion 402 in a substantially orthogonal manner. In FIG. 15, the plate member 400 is shown coupled to a frame member 298 of the frame assembly 17 of the seat portion 16. The configuration of the first and second portions 402, 404 of the plate member 400 allows for the plate member 400 to wrap around an edge portion 299 of the frame member 298. The first portion 402 of the plate member 400 includes first and second raised portions 406, 408 that are spaced-apart from one another to define a channel 410 therebetween. The channel 410 is a downwardly angled and tapered channel from a front portion 410A of the channel 410 to a rear portion 410B of the channel 410. Thus, the front portion 410A of the channel 410 is wider than the rear portion 410B of the channel 410, such that the channel 410 can guide the body portion of a tether member therealong, as further described below.

As further shown in FIG. 15, the second routing mechanism 72 includes a connection assembly 420 having upper and lower tabs 422, 424 spaced-apart from one another to define a receiving space 426 disposed therebetween. A routing column assembly 430 is positioned within the receiving space 426 and interconnects the upper and lower tabs 422, 424. The routing column assembly 430 is contemplated to be the same or similar to the routing column assemblies 280, 282, 284, 286, 290 and 292 provided in the retraction mechanism 120 described above and illustrated in FIG. 13. As such, the routing column assembly 430 includes a mounting member 300 with a sleeve member 306 contemplated to be mounted in a rotatable manner on a shaft member 301 (FIG. 13) of the mounting member 300. The routing column assembly 430 further includes the connection member 312 coupled to an upper portion of the mounting member 300. As a rotatable member, the sleeve member 306 is contemplated to route the body portion of a tether member in a low friction configuration from a first direction to a second direction, as further described below. In the embodiment shown in FIG. 15, the upper and lower tabs 422, 424 rearwardly extend from the second portion 404 of the plate member 400. As further shown in the embodiment of FIG. 15, the rear portion 410B of the channel 410 opens outwardly towards the routing column assembly 430.

As further shown in FIG. 15, the second tether member 110 is shown as having the body portion 116 thereof routed through the second routing mechanism 72. It is contemplated that the first tether member 100 also engages the first routing mechanism 70 in a similar manner, such that the description of the engagement between the second tether member 110 and the second routing mechanism 72 is meant to also describe the engagement of the first tether member 100 and the first routing mechanism 70. In FIG. 15, the body portion 116 of the second tether member 110 is routed from an area 16C positioned above the seat portion 16, to an area 16D position below the seat portion 16 via the second routing mechanism 72. In this way, the body portion 116 of the second tether member 110 is positioned in a first direction 440, which is a downwardly angled direction, upstream from the second routing mechanism 72. The body portion 116 of the second tether member 110 is then received within the channel 410 of the second routing mechanism 72, and is then channeled towards the routing column assembly 430 via the channel 410. As shown in FIG. 15, the body portion 116 of the second tether member 110 is then wrapped around the routing column assembly 430 and directed towards the area 16D below the seat portion 16. At this position, downstream from the second routing mechanism 72, the body portion 116 of the second tether member 110 is positioned in a second direction 442 which is a forward direction. Thus, the body portion 116 of the second tether member 110 is routed through the second routing mechanism 72 from a first direction 440 (a downwardly angled direction) to a second direction 442 (a forward direction).

Figure 16:
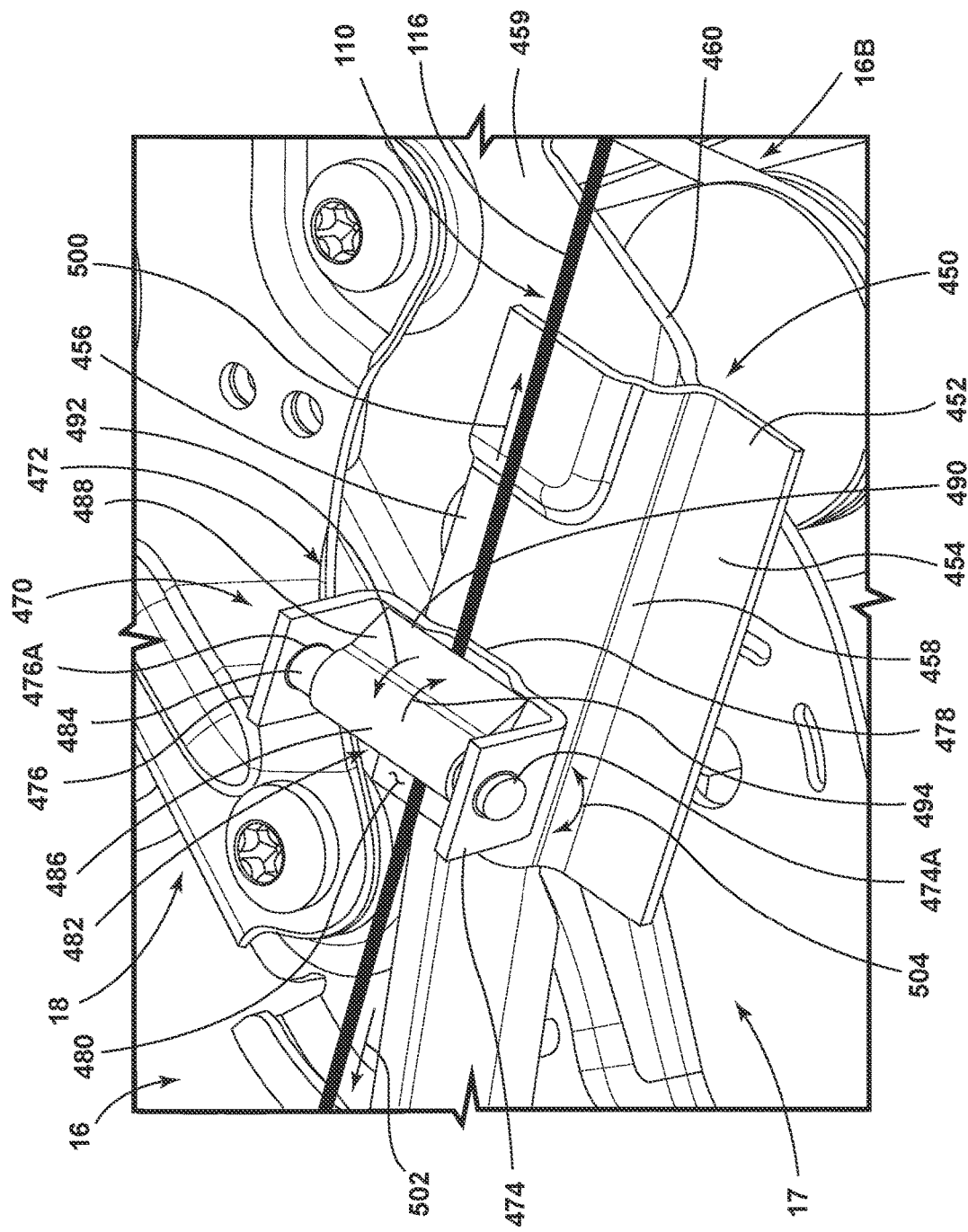
FIG. 16 is a top perspective view of a lock mechanism engaged with a tether member along a seat frame.

Referring now to FIG. 16, the first and second routing mechanisms 70, 72 may be used in conjunction with a lock mechanism 450. The lock mechanism 450 is shown in FIG. 16 as being coupled to the frame assembly 17 of the seat portion 16 near the rear portion 16B of the seat portion 16.

The description of the lock mechanism 450 provided herein is meant to also described a similar lock mechanism that can be used with the first tether member 100 on an opposite side of the seat portion 16. As shown in FIG. 16, the lock mechanism 450 includes a plate member 452 having a first portion 454 and a second portion 456 with a transition portion 458 disposed therebetween. Thus, the plate member 452 of the lock mechanism 450 includes a stepped configuration, wherein the first portion 454 extends inwardly from the second portion 456. In FIG. 16, the plate member 452 is shown coupled to a frame member 459 of the frame assembly 17 of the seat portion 16. The configuration of the first and second portions 454, 456 of the lock mechanism 450 allows for the plate member 452 to abut an edge portion 460 of the frame member 459.

As further shown in FIG. 16, the lock mechanism 450 includes a lock assembly 470 having a frame portion 472. The frame portion 472 includes first and second arms 474, 476 that are interconnected by a web portion 478. As such, the first and second arms 474, 476 of the frame portion 472 outwardly extend from the interconnecting web portion 478. The first and second arms 474, 476 are spaced-apart from one another to define a receiving space 480 therebetween. The first and second arms 474, 476 each include a mounting aperture 474A, 476A, respectively. A rotating catch member 482 is mounted on an axle member 484 that is mounted on the mounting apertures 474A, 476A of the first and second arms 474, 476. Specifically, the rotating catch member 482 includes a cylindrical body portion 486 having a flange portion 488 that outwardly extends therefrom. The flange portion 488 includes a distal end 490. As mounted to the frame portion 472, the rotating catch member 482 is configured to rotate between an upward direction, as indicated by arrow 492, and a downward direction, as indicated by arrow 494. In use, the lock assembly 470 is configured to provide an anti-back-drive feature for the seat assembly 10. Specifically, the body portion 116 of the second tether member 110 is shown being received between the interconnecting web portion 478 of the frame portion 472 and the rotating catch member 482, at the distal end 490 thereof. As such, it is contemplated that as the second tether member 110 retracts in the direction as indicated by arrow 500, the rotating catch member 482 may slightly rotate in the upward direction as indicated by arrow 492 to allow the body portion 116 of the second tether member 110 to pass between the rotating catch member 482 and the interconnecting web portion 478 of the frame portion 472. In this way, the body portion 116 of the second tether member 110 is releasably retained between the distal end 490 of the flange portion 488 of the rotating catch member 482 and the interconnecting web portion 478 of the frame portion 472. However, should pressure from a seat occupant 90 pull on the body portion 116 of the second tether member 110 in the direction as indicated by arrow 502, the distal end 490 of the rotating catch member 482 is configured to dig into the body portion 116 of the second tether member to further engage the distal end 490 of the rotating catch member 482 with the interconnecting web portion 478 of the frame portion 472. Further, it is contemplated that the rotating catch member 482 may be biased for a downward rotation along the path as indicated by arrow 494, such that the rotating catch member 482 is biased towards a position in which the distal end 490 of the flange portion 488 of the rotating catch member 482 is engaged with the interconnecting web portion 478 of the frame portion 472 and/or the body portion 116 of the second tether member 110. Further, it is contemplated that the frame portion 472 may be rotatably mounted on the plate member 452, such that the lock assembly 470 can rotate in the directions as indicated by arrow 504. In this way, the lock assembly 470 can rotate along with the second tether member 110 as a second tether member 110 moves from a stowed position (FIG. 5) to a deployed position (FIGS. 8A-8C). Further, it is contemplated that the lock assembly 470 is positioned upstream from the first and second routing mechanisms 70, 72. In fact, the lock assembly 470 may be mounted directly to the plate member 400 of the routing mechanisms 70, 72 to integrate the lock mechanism and the routing mechanisms 70, 72.

Figure 17A:
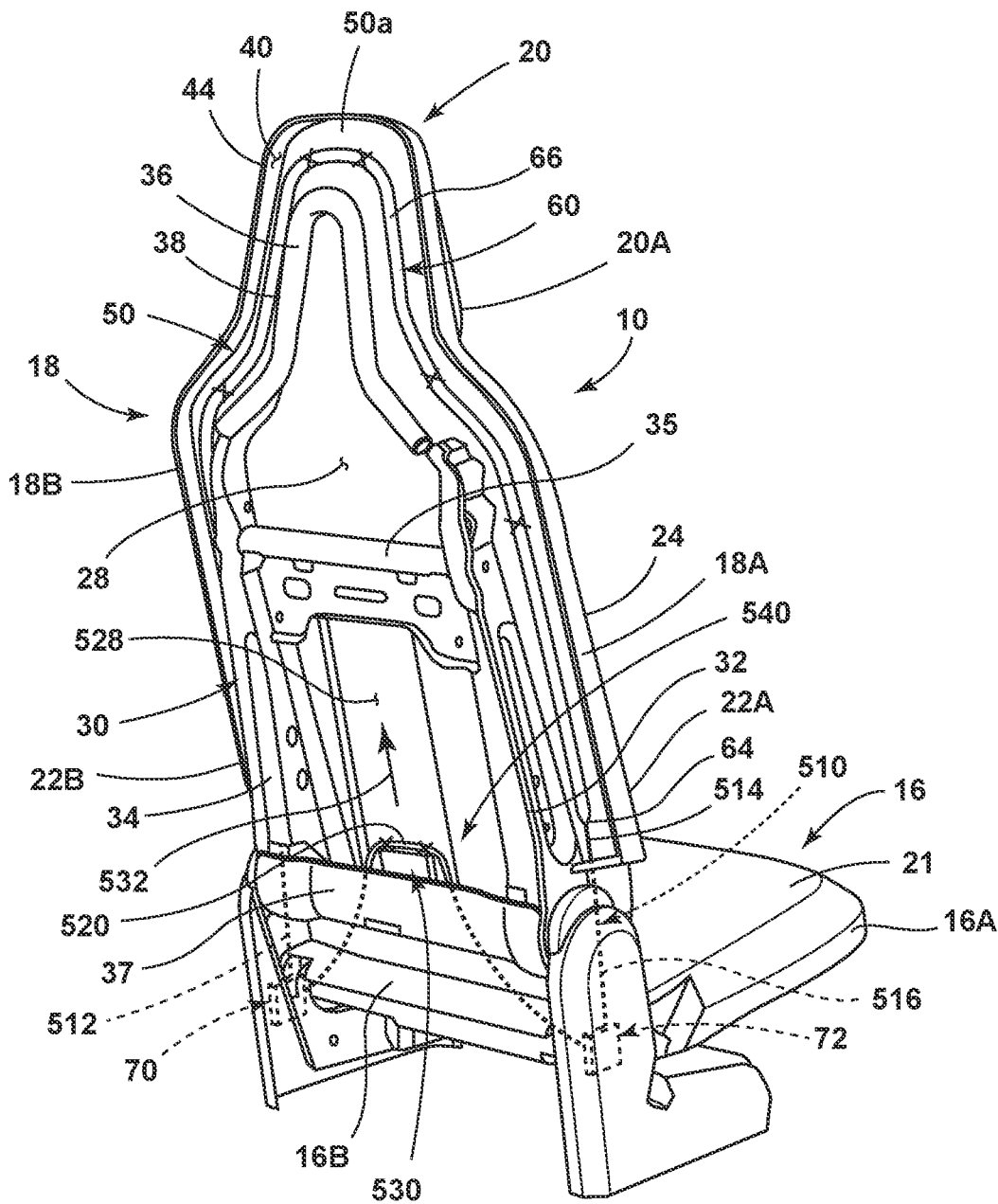
FIG. 17A is a rear top perspective view of the seat assembly of FIG. 4 with a retraction mechanism disposed within an interior of the seatback.

Referring now to FIG. 17A, the seat assembly 10 is shown with the rear carrier module 26 (FIG. 2) removed to reveal the interior portion 28 of the seatback 18. Within the interior portion 28 of the seatback 18, a cavity 528 is provided. An airbag 530 is shown disposed within the cavity 528 of the interior portion 20 of the seatback 18. In FIG. 17A, the airbag 530 is shown in an at-rest condition. The airbag 530 is operable between the at-rest condition, shown in FIG. 17A, and a deployed condition, shown in FIGS. 17B, 17C. As further shown in FIG. 17A, a tether member 510 includes first and second ends 512, 514 with a body portion 516 disposed therebetween. As specifically shown in FIG. 17A, the second end 514 of the tether member 510 is coupled to the second end 64 of the belt member 60. As such, it is contemplated that the first end 512 of the tether member 510 is coupled to the first end 62 of the belt member 60 on an opposite side 18B of the seatback 18. The tether member 510 further includes an intermediate portion 520. The intermediate portion 520 of the tether member 510 is routed to the interior portion 28 of the seatback 18 by first and second routing mechanisms 70, 72, and is specifically disposed within the cavity 528 of the interior portion 28 of the seatback 18. Within the cavity 528 of the interior portion 28 of the seatback 18, the intermediate portion 520 of the tether member 510 is coupled to the airbag 530 for movement therewith. The "X" symbols shown in FIG. 17A may include clips, stitches or other like coupling mechanisms that operably couple the intermediate portion 520 of the tether member 510 to the airbag 530 for deployment therewith. As the tether member 510 is deployed with the airbag 530, the tether member 510 and the airbag 530 cooperate to define a retraction mechanism 540 disposed within the interior portion 28 of the seatback 18.

Figure 17B:
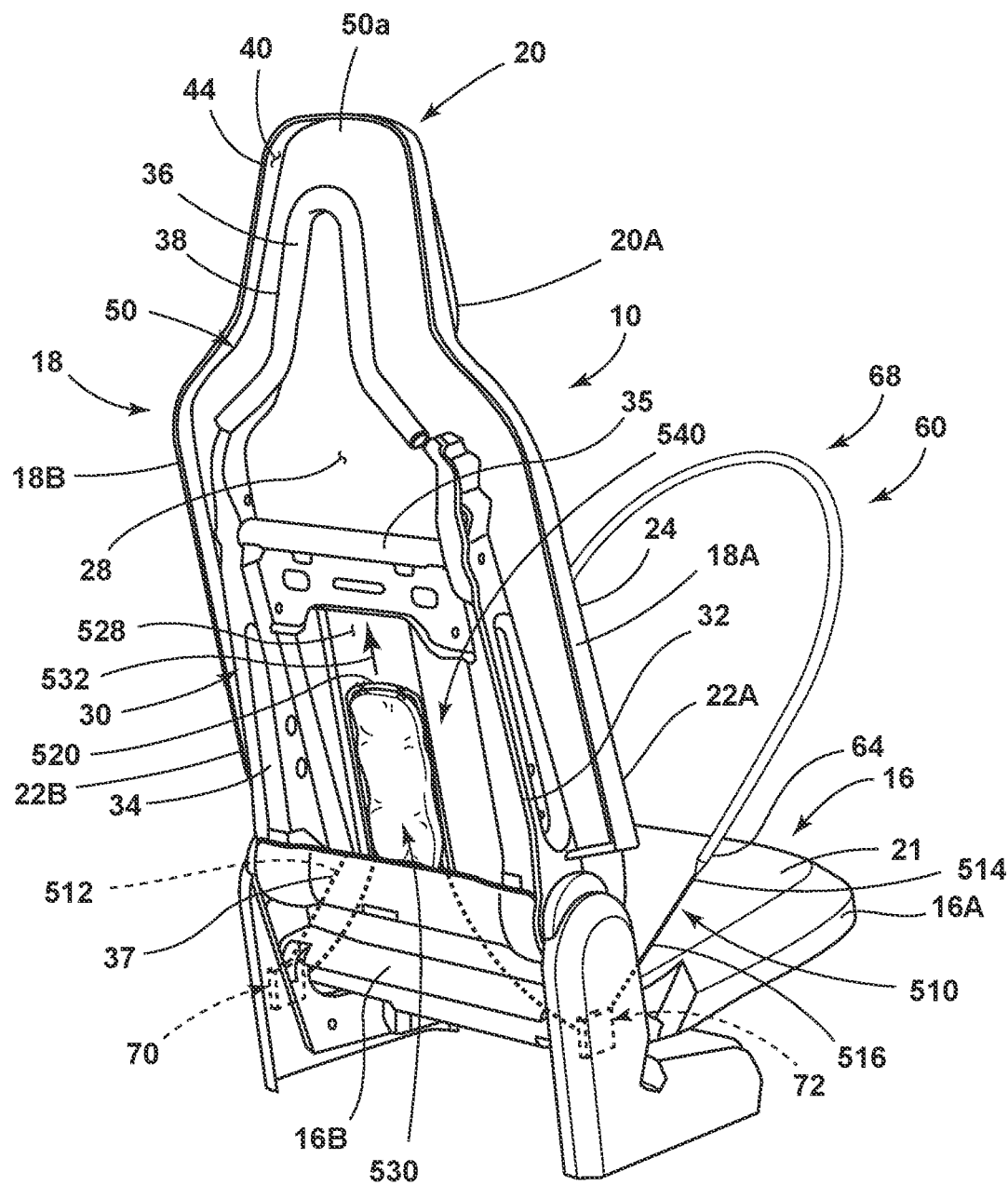
FIG. 17B is a rear top perspective view of the seat assembly of FIG. 17A with the retraction mechanism in a deployed condition.

Referring now to FIG. 17B, the belt member 60 of the belt assembly 68 is shown in a deployed position around the seatback 18. As noted above, the belt member 60 is contemplated to be deployed with the airbag assembly 50. However, in FIG. 17B, the airbag assembly 50 is shown within the interior portion 28 of the seatback 18 so that the belt member 60 can be clearly seen in the deployed position. Along with the deployment of the belt member 60 via the airbag assembly 50, the airbag 530 is shown in FIG. 17B in the deployed condition and it is contemplated that the airbag assembly 50 and the airbag 530 can use the same one or more inflator mechanisms, such as the inflator mechanisms identified in U.S. Pat. No. 10,821,929 at reference numerals 142, 144 used in conjunction with airbag assembly 150. As such, it is contemplated that the airbag assembly 50 and the airbag 530 may be deployed at the same time, such that the belt member 60 is moved to the deployed position, and is also retracted by the connection between the airbag 530 and the tether member 510. Further, it is contemplated that a pyrotechnic device may be used to inflate the airbag assembly 50 and the airbag 530, wherein the pyrotechnic device generates gas pressure that rapidly inflates the airbag assembly 50 and the airbag 530 simultaneously. Thus, while the airbag 530 is retained within the interior portion 28 of the seatback 18 as the airbag 530 converts from the at-rest condition to the deployed condition, the airbag 530 is a rapid inflation device configured to rapidly retract the belt member that is much different than an air bladder in a seatback that is used for seat occupant comfort adjustment settings.

Figure 17C:
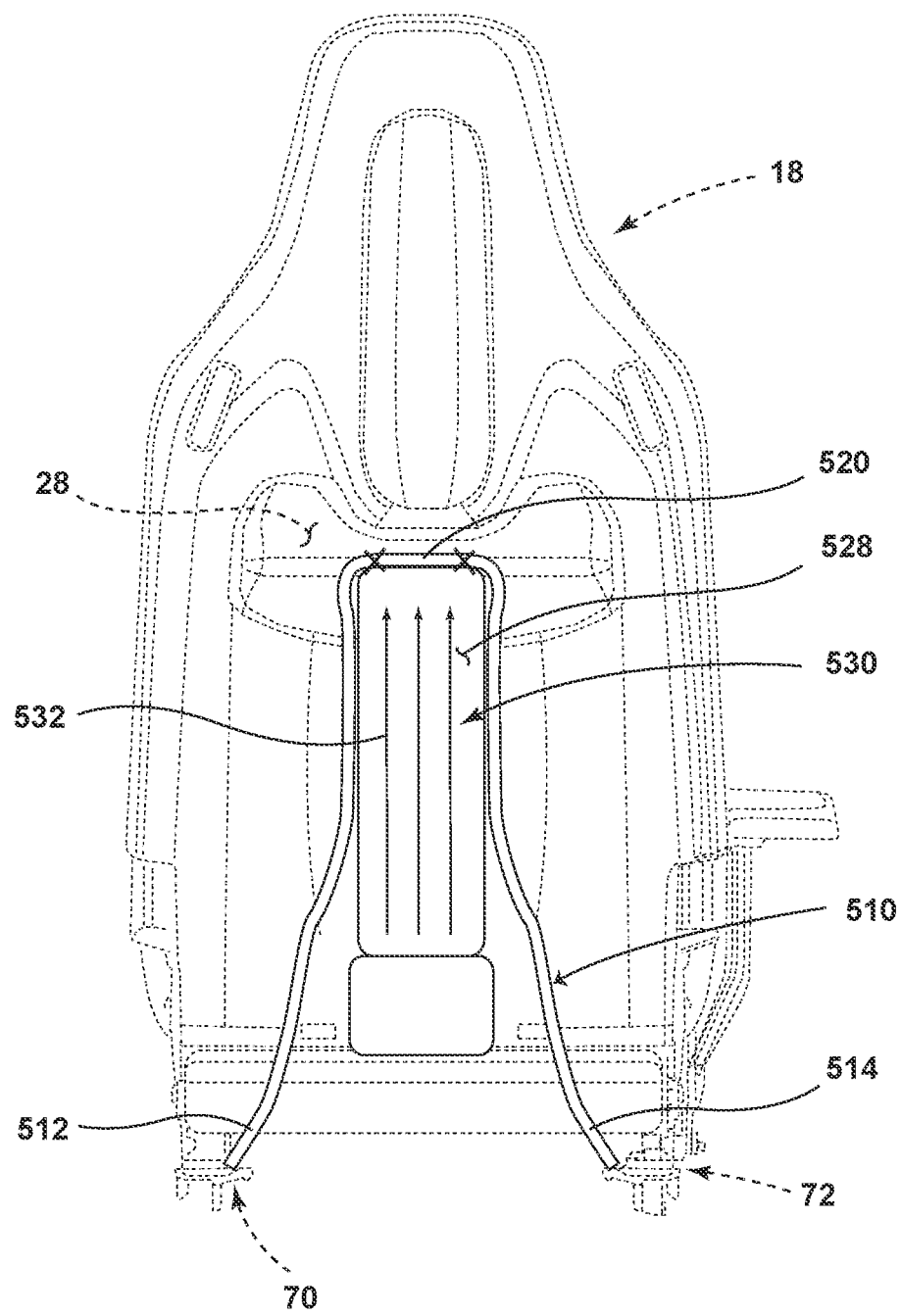
FIG. 17C is a rear elevation view of the seat back of FIG. 17B shown in phantom to reveal the retraction mechanism in a deployed condition.

As specifically shown in FIGS. 17B and 17C, the airbag 530 has moved upward within the cavity 528 in the direction as indicated by arrow 532 from the at-rest condition to the deployed condition. As coupled to the airbag 530, the intermediate portion 520 of the tether member 510 is also drawn upward within the cavity 528 of the seatback 18, such that the first and second ends 512, 514 are retracted inwardly towards the interior portion 28 of the seatback 18, which also retracts the belt member 60 around a seat occupant. As such, the tether member 510 is operable between a stowed position (FIG. 17A), a deployed position, and a retracted position (FIGS. 17B and 17C). It is contemplated that a single tether member 510 may be used to provide the retraction of the belt member 60, or dual tether members, like first and second tether members 100, 110, can be positioned on opposite sides 22A, 22B of the seatback 18.

Figure 18A:
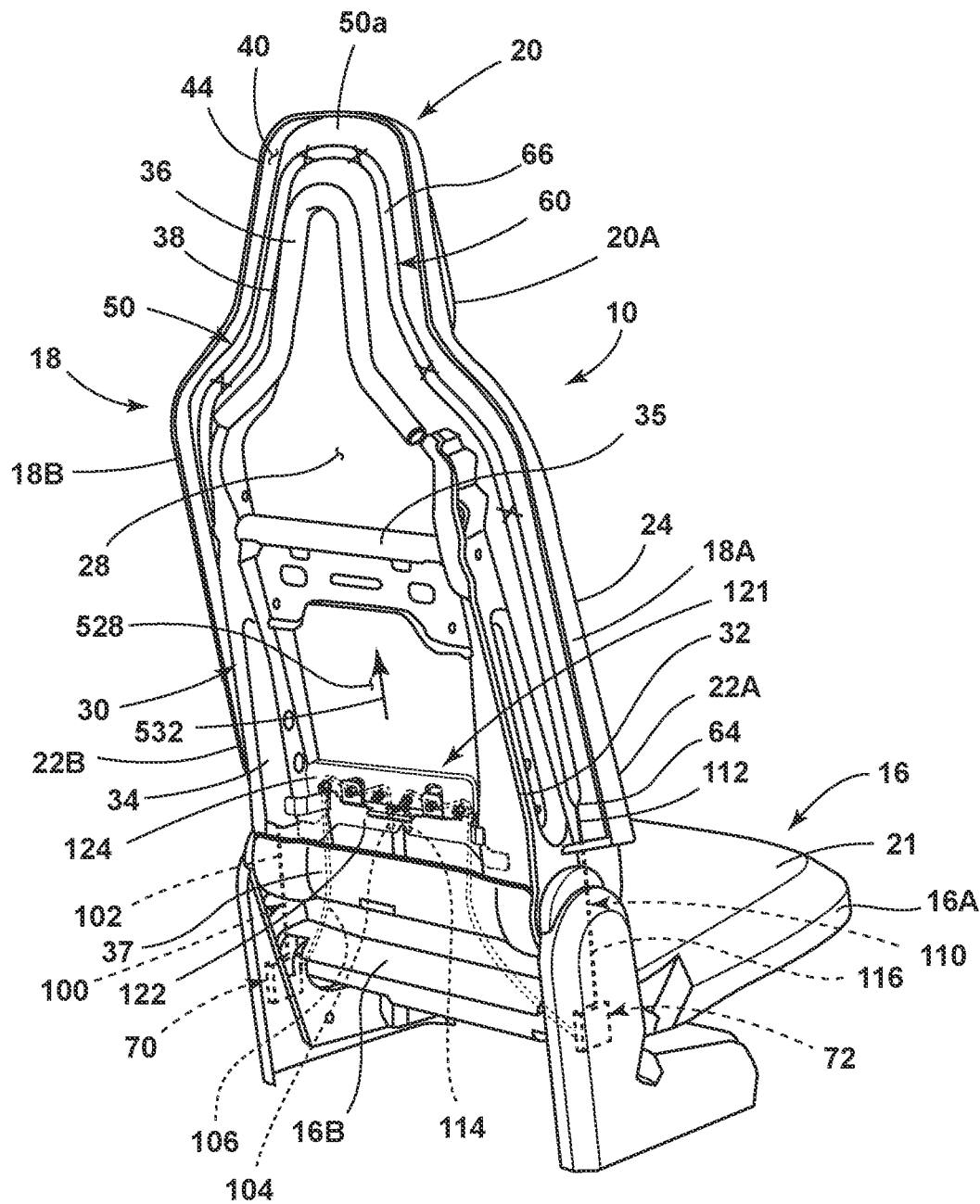
FIG. 18A is a rear top perspective view of the seat assembly of FIG. 4 with a retraction mechanism disposed within an interior of the seatback.
Figure 18B:
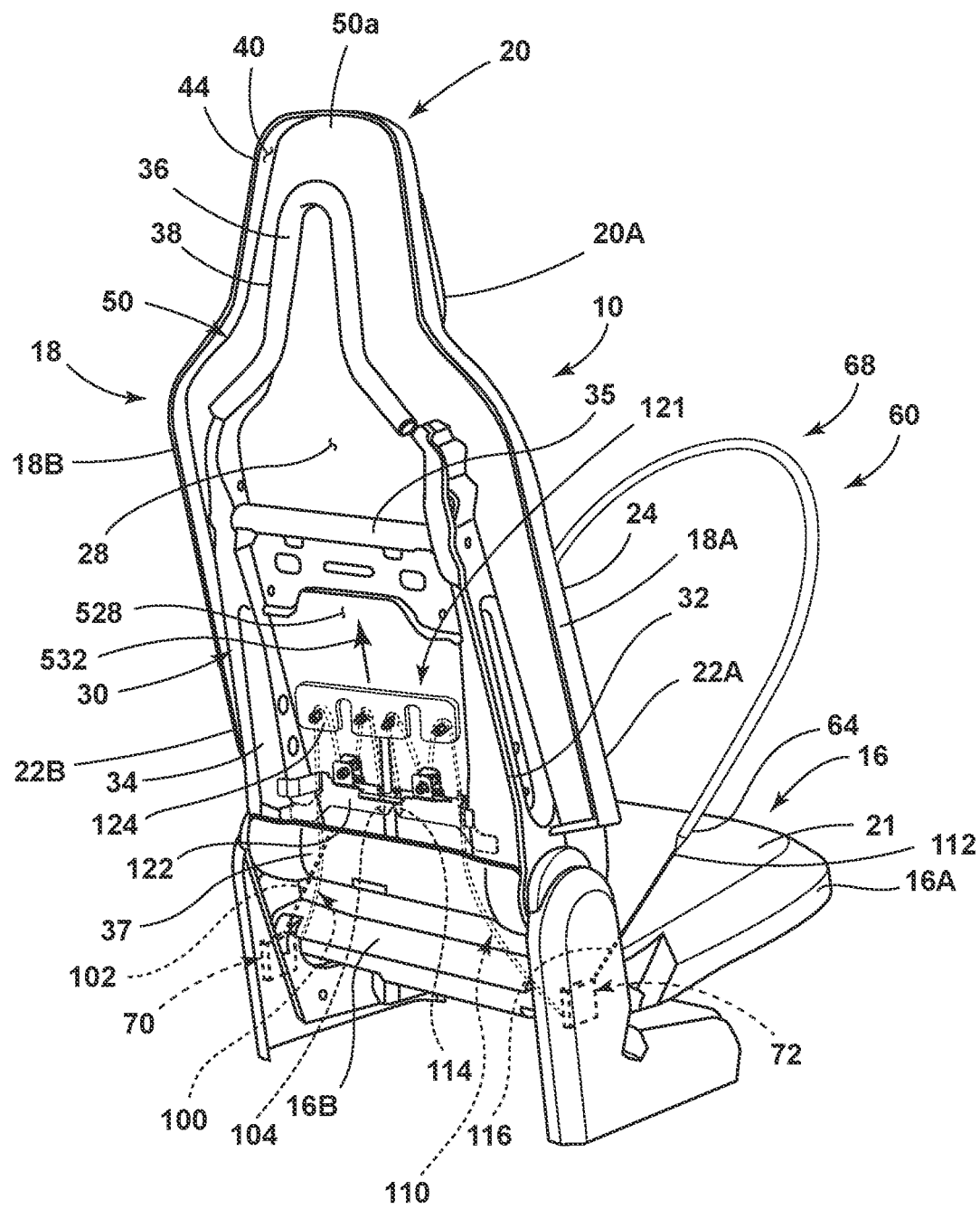
FIG. 18B is a rear top perspective view of the seat assembly of FIG. 18A with the retraction mechanism in a deployed condition.

Referring now to FIGS. 18A and 18B, a retraction mechanism 121 is shown coupled to the seatback frame 30 within the interior portion 28 of the seatback 18. The retraction mechanism 121 includes similar component parts as the retraction mechanism 120 described above. As such, like reference numerals used to describe the retraction mechanism 120 will be used to describe the retraction mechanism 121. As noted above, the seatback frame 30 includes first and second side members 32, 34 which are disposed in an upright orientation and spaced-apart from one another. In this way, the connection arms 204A, 206A and 204B, 260B disposed respectively on the opposite first and second sides 122A, 122B of the first bracket 120 can couple to the spaced-apart first and second side members 32, 34 of the seatback frame 30, at inner and outer portions thereof. In this way, the first bracket 120 is again fixed in-place on a frame member of the seat assembly 10. In the orientation shown in FIG. 18, the second bracket 124 moves away from the first bracket 122 as the second bracket 124 moves from the first position (FIG. 18A) to the second position (FIG. 18B) in an upward direction along the path as indicated by arrow 532. As such, it is contemplated that the first and second tether members 100, 110 are routed towards the interior portion 28 of the seatback 18 in FIGS. 18A, 18B via the first and second routing mechanisms 70, 72. In a similar manner as described above, the movement of the second bracket 124 between the first and second positions retracts the first and second tether members 100, 110 to thereby also retract the belt member 60 of the belt assembly 68. As such, the operation of the retraction mechanism 121 as disposed within the interior portion 28 of the seatback 18 is contemplated to be the same as the operation of the retraction mechanism 120 described above as shown disposed below the seat portion 16 of the seat assembly 10.

According to one aspect of the present invention, a seat assembly includes a seatback having an interior portion. The seatback includes a back support portion centrally disposed thereon. A retraction mechanism is positioned within the interior portion of the seatback. The retraction mechanism includes an airbag that is operable between at-rest and deployed conditions. A tether member includes first and second ends with a body portion disposed therebetween. The body portion of the tether member is operably coupled to the airbag of the retraction mechanism for movement therewith. The tether member moves from a deployed position to a retracted position when the airbag moves from the at-rest condition to the deployed condition. A belt member includes first and second ends with a body portion disposed therebetween. The first and second ends of the belt member are respectively coupled to the first and second ends of the tether member. The body portion of the belt member is operable between a deployed position, wherein the belt member is disposed in front of the back support portion of the seatback, and a stowed position, wherein the belt member is received in the interior portion of the seatback.

Embodiments of the first aspect of the invention can include any one or a combination of the following features:
- an overhead airbag assembly is supported in the interior portion of the seatback in a stowed position, and the airbag assembly is configured to deploy from the stowed position to a deployed position in a seat-forward direction around the back support portion of the seatback;
- the body portion of the belt member is operably coupled to the overhead airbag assembly for deployment therewith;
- the belt member is retracted towards the seat assembly from the deployed position as the airbag moves from the at-rest condition to the deployed condition;
- the airbag moves upward from the at-rest condition to the deployed condition; and
- the airbag is retained in the interior portion of the seatback as the airbag moves between the at-rest condition and the deployed condition.

According to another aspect of the present invention, a seat assembly includes a seatback having a forward-facing back support portion and an interior portion. The seatback further includes a seatback frame disposed within the interior portion. A retraction mechanism includes a first bracket operably coupled to the seatback frame. A second bracket is operably coupled to the first bracket. The first and second brackets are interconnected by an actuator that is operable between at-rest and actuated positions. A tether member includes a body portion that is operably coupled between the first and second brackets of the retraction mechanism for movement therewith. The tether member moves from a deployed position to a retracted position when the actuator moves from the at-rest position to the actuated position. A belt member is operably coupled to the tether member. The belt member is operable between a deployed position, wherein the belt member is disposed in front of the back support portion of the seatback, and a stowed position, wherein the belt member is received in the interior portion of the seatback.

Embodiments of the second aspect of the invention can include any one or a combination of the following features:
- the actuator includes a piston assembly having a housing coupled to the first bracket, and a rod slideably received within the housing and coupled to the second bracket;
- the second bracket is operable between first and second positions, and the second bracket moves from the first position to the second position as the actuator moves from the at-rest position to the actuated position;
- the second bracket moves upward relative to the first bracket when the second bracket moves from the first position to the second position;
- the first bracket includes one or more routing column assemblies, and the second bracket includes one or more routing column assemblies;
- the body portion of the tether member is interlaced between the one or more routing column assemblies of the first bracket and the one or more routing column assemblies of the second bracket; and a first portion of the body portion of the tether member is interlaced between the one or more routing column assemblies of the first bracket and the one or more routing column assemblies of the second bracket when the actuator is in the at-rest position, and a second portion of the body portion of the tether member is interlaced between the one or more routing column assemblies of the first bracket and the one or more routing column assemblies of the second bracket when the actuator is in the actuated position, and the second portion of the body portion of the tether member is longer than the first portion of the body portion of the tether member.

According to yet another aspect of the present invention, a seat assembly includes a seatback having a seatback frame disposed within a seatback interior. A retraction mechanism is disposed within the seatback interior. The retraction mechanism is operable between at-rest and deployed positions. At least one tether member includes a body portion. The body portion of the at least one tether member is operably coupled to the retraction mechanism for movement therewith.

Embodiments of the third aspect of the invention can include any one or a combination of the following features:

the retraction mechanism includes first and second brackets moveably associated with one another, such that the second bracket is operable between first and second positions, and the second bracket moves away from the first bracket in an upward direction when the second bracket moves from the first position to the second position to define the at-rest and deployed positions of the retraction mechanism; the at least one tether member includes a body portion interlaced between the first and second brackets of the retraction mechanism;

the at least one tether member moves from a deployed position to a retracted position when the second bracket moves from the first position to the second position;

the retraction mechanism includes an airbag that is operable between at-rest and deployed conditions within the interior of the seatback to define the at-rest and deployed positions of the retraction mechanism;

the body portion of the at least one tether member is operably coupled to the airbag; and the at least one tether member moves from a deployed position to a retracted position when the airbag converts from the at-rest condition to the deployed condition.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
a seatback having an interior portion, wherein the seatback includes a back support portion centrally disposed thereon;
a retraction mechanism positioned within the interior portion of the seatback, wherein the retraction mechanism includes an airbag that is operable between at-rest and deployed conditions, and further wherein the airbag is retained in the interior portion of the seatback as the airbag moves between the at-rest condition and the deployed condition;
a tether member having first and second ends with a body portion disposed therebetween, wherein the body portion is operably coupled to the airbag of the retraction mechanism for movement therewith, and further wherein the tether member moves from a deployed position to a retracted position when the airbag moves from the at-rest condition to the deployed condition;
a belt member having first and second ends with a body portion disposed therebetween, wherein the first and second ends of the belt member are respectively coupled to the first and second ends of the tether member, and further wherein the body portion of the belt member is operable between a deployed position, wherein the belt member is disposed in front of the back support portion of the seatback, and a stowed position, wherein the belt member is received in the interior portion of the seatback; and
an overhead airbag assembly supported in the interior portion of the seatback in a stowed position, wherein the airbag assembly is configured to deploy from the stowed position to a deployed position in a seat-forward direction around the back support portion of the seatback.

2. The seat assembly of claim 1, wherein the body portion of the belt member is operably coupled to the overhead airbag assembly for deployment therewith.

3. The seat assembly of claim 2, wherein the belt member is retracted towards the seat assembly from the deployed position as the airbag moves from the at-rest condition to the deployed condition.

4. The seat assembly of claim 3, wherein the airbag moves upward from the at-rest condition to the deployed condition.

5. A seat assembly, comprising:
a seatback having a forward-facing back support portion and an interior portion, wherein the seatback further includes a seatback frame disposed within the interior portion;
a retraction mechanism having a first bracket operably coupled to the seatback frame, and a second bracket operably coupled to the first bracket, wherein the first and second brackets are interconnected by an actuator that is operable between at-rest and actuated positions;
a tether member having a body portion operably coupled between the first and second brackets of the retraction mechanism for movement therewith, wherein the tether member moves from a deployed position to a retracted position when the actuator moves from the at-rest position to the actuated position; and
a belt member operably coupled to the tether member, wherein the belt member is operable between a deployed position, wherein the belt member is disposed in front of the back support portion of the seatback, and a stowed position, wherein the belt member is received in the interior portion of the seatback.

6. The seat assembly of claim 5, wherein the actuator includes a piston assembly having a housing coupled to the first bracket, and a rod slideably received within the housing and coupled to the second bracket.

7. The seat assembly of claim 5, wherein the second bracket is operable between first and second positions, and further wherein the second bracket moves from the first position to the second position as the actuator moves from the at-rest position to the actuated position.

8. The seat assembly of claim 7, wherein the second bracket moves upward relative to the first bracket when the second bracket moves from the first position to the second position.

9. The seat assembly of claim 8, wherein the first bracket includes one or more routing column assemblies, and further wherein the second bracket includes one or more routing column assemblies.

10. The seat assembly of claim 9, the body portion of the tether member is interlaced between the one or more routing column assemblies of the first bracket and the one or more routing column assemblies of the second bracket.

11. The seat assembly of claim 10, wherein a first portion of the body portion of the tether member is interlaced between the one or more routing column assemblies of the first bracket and the one or more routing column assemblies of the second bracket when the actuator is in the at-rest position, and further wherein a second portion of the body portion of the tether member is interlaced between the one or more routing column assemblies of the first bracket and the one or more routing column assemblies of the second bracket when the actuator is in the actuated position, wherein the second portion of the body portion of the tether member is longer than the first portion of the body portion of the tether member.

12. A seat assembly, comprising:
- a seatback having a seatback frame disposed within a seatback interior;
- a retraction mechanism disposed within the seatback interior, wherein the retraction mechanism is operable between at-rest and deployed positions, and further wherein the retraction mechanism includes first and second brackets moveably associated with one another, and further wherein the second bracket is operable between first and second positions, and further wherein the second bracket moves away from the first bracket in an upward direction when the second bracket moves from the first position to the second position to define the at-rest and deployed positions of the retraction mechanism; and
- at least one tether member having a body portion, wherein the body portion of the at least one tether member is operably coupled to the retraction mechanism for movement therewith.

13. The seat assembly of claim 12, wherein the at least one tether member includes a body portion interlaced between the first and second brackets of the retraction mechanism.

14. The seat assembly of claim 13, wherein the at least one tether member moves from a deployed position to a retracted position when the second bracket moves from the first position to the second position.

15. A seat assembly, comprising:
- a seatback having a seatback interior;
- a seatback frame disposed within the seatback interior, wherein the seatback frame includes first and second side members which are disposed in an upright orientation and spaced-apart from one another to define a cavity therebetween;
- a retraction mechanism disposed within the cavity of the seatback interior, wherein the retraction mechanism is operable between at-rest and deployed positions, wherein the retraction mechanism includes an airbag that is operable between at-rest and deployed conditions within the cavity of the seatback interior to define the at-rest and deployed positions of the retraction mechanism; and
- at least one tether member having a body portion, wherein the body portion of the at least one tether member is operably coupled to the retraction mechanism for movement therewith.

16. The seat assembly of claim 15, wherein the body portion of the at least one tether member is operably coupled to the airbag.

17. The seat assembly of claim 16, wherein the at least one tether member moves from a deployed position to a retracted position when the airbag converts from the at-rest condition to the deployed condition.

* * * * *